United States Patent [19]

Synosky et al.

[11] Patent Number: 5,424,080
[45] Date of Patent: Jun. 13, 1995

[54] WAX-FREE CHEWING GUM BASE

[75] Inventors: Steven P. Synosky, Green Brook, N.J.; Jayant C. Dave, Bloomingdale, Ill.; John W. Foster, Piscataway, N.J.; Gerard Mey, Meyenheim, France; Michael A. Reed, Merrillville, Ind.; Scott E. Hartman, Roosevelt, N.J.

[73] Assignee: Wm. Wrigley Jr. Company, Chicago, Ill.

[21] Appl. No.: 98,706

[22] Filed: Jul. 28, 1993

Related U.S. Application Data

[63] Continuation-in-part of Ser. No. 906,921, Jun. 30, 1992, Pat. No. 5,286,500.

[51] Int. Cl.⁶ ............................................. A23G 3/30
[52] U.S. Cl. ............................................. 426/3; 426/6
[58] Field of Search ................................. 426/3–6

[56] References Cited

U.S. PATENT DOCUMENTS

| | | |
|---|---|---|
| 1,534,929 | 4/1925 | Dunham . |
| 2,085,490 | 6/1937 | Blaikie ................................ 426/6 |
| 2,124,235 | 7/1938 | Mueller-Cunradi ................ 426/6 |
| 2,383,145 | 8/1945 | Moose ................................ 426/6 |
| 3,063,844 | 11/1962 | Meguro et al. .................... 426/4 |
| 3,285,750 | 11/1966 | Ishida ................................ 426/3 |
| 3,396,038 | 8/1968 | Knapp ................................ 426/6 |
| 3,440,060 | 4/1969 | Rife et al. ........................ 426/3 |
| 3,473,932 | 10/1969 | Sirota et al. .................... 426/6 |
| 3,857,965 | 12/1974 | Ream ................................ 426/3 |
| 3,984,574 | 10/1976 | Comollo ............................ 426/4 |
| 4,088,788 | 5/1978 | Ream et al. ........................ 426/3 |
| 4,188,406 | 2/1980 | Sarkisian et al. ................ 426/3 |
| 4,252,830 | 2/1981 | Kehoe et al. .................... 426/5 |
| 4,352,822 | 10/1982 | Cherukuri et al. .............. 426/5 |
| 4,352,823 | 10/1982 | Cherukuri et al. .............. 426/5 |
| 4,357,355 | 11/1982 | Koch et al. ...................... 426/4 |
| 4,556,565 | 12/1985 | Arima et al. .................... 426/3 |
| 4,582,707 | 4/1986 | Calabro ............................ 426/4 |
| 4,721,620 | 1/1988 | Cherukuri et al. .............. 426/6 |
| 4,794,003 | 12/1988 | Cherukuri et al. .............. 426/6 |
| 4,806,364 | 2/1989 | Kubota et al. .................. 426/5 |
| 4,872,884 | 10/1989 | Cherukuri et al. .............. 426/3 |
| 4,915,958 | 4/1990 | Faust et al. .................... 426/3 |
| 4,975,270 | 12/1990 | Kehoe ................................ 426/3 |
| 5,023,093 | 6/1991 | Cherukuri et al. .............. 426/3 |
| 5,110,608 | 5/1992 | Cherukuri et al. .............. 426/3 |
| 5,173,317 | 12/1992 | Hartman et al. ................ 426/6 |

FOREIGN PATENT DOCUMENTS

| | | |
|---|---|---|
| 0067665A2 | 12/1982 | European Pat. Off. . |
| 0271445 | 6/1988 | European Pat. Off. . |
| 84-042855 | 9/1972 | Japan . |
| 89-43543 | 10/1981 | Japan . |
| 347376 | 4/1931 | United Kingdom . |
| 378073 | 8/1932 | United Kingdom . |

Primary Examiner—Jeanette Hunter
Attorney, Agent, or Firm—Hill, Steadman & Simpson

[57] ABSTRACT

A gum base, as well as methods for making same, is provided which is free of wax, but has an increased glass transition temperature. It has been found by removing or reducing gum base vinyl polymer softeners that the glass transition temperature of the gum base can be raised to a temperature wherein even at elevated ambient temperatures, blocking (agglomeration) does not occur.

20 Claims, 4 Drawing Sheets

WAX-FREE CHEWING GUM BASE

This is a continuation-in-part of U.S. patent application Ser. No. 07/906,921, filed on Jun. 30, 1992 entitled: "IMPROVED WAX-FREE CHEWING GUM BASE", now U.S. Pat. No. 5,286,500 which is a continuation-in-part of PCT Patent Application No. PCT/US92/01686 filed on Mar. 3, 1992, in the U.S. Receiving Office under the Patent Cooperation Treaty entitled: "IMPROVED WAX-FREE CHEWING GUM BASE" and naming Steven Synosky as the inventor.

FIELD OF THE INVENTION

The present invention relates to improved chewing gum bases of the type which do not contain wax, and to methods of preparing chewing gum bases which do not contain wax.

BACKGROUND OF THE INVENTION

Recently, in the United Kingdom, the use of wax, especially mineral hydrocarbon wax, in gum bases, has come under scrutiny. There is a perception in the United Kingdom that it may not be desirable to use wax in gum bases. This perception could result in possible regulatory issues, in the United Kingdom, concerning the use of wax in gum base.

Unfortunately, one cannot merely remove wax from a gum base without possibly compromising certain desirable characteristics of the resulting chewing gum product. Wax provides a number of functions in the gum base. For example, wax can influence the release of flavor from the gum product. Furthermore, wax aids in the curing of the finished gum product that is made from the gum base. Additionally, wax contributes to the shelf-life of the finished gum and its texture.

Although some gum bases are known that do not contain wax, they, the inventors believe, typically do not have the chew characteristics, in addition to other characteristics, of typical chewing gums that are created from wax containing gum bases. Heretofore, gum bases without wax were not created in response to any regulatory concerns, but rather, were merely created as part of bases to achieve other ends, for example, a non-tack gum. Therefore, in certain instances, compromises with respect to certain characteristics may have been made to achieve other results, e.g., non-tack, reduced calories, etc.

U.S. Pat. No. 3,984,574, issued to Comollo, discloses an adhesive chewing gum base in which the non-tack properties were achieved by eliminating conventional chewing gum base ingredients which were found to contribute to chewing gum tackiness, and by substituting non-tacky ingredients in place of the conventional ingredients. Specifically, it was discovered that three classes of materials account for conventional chewing gum tackiness. These materials are elastomers, resins, and waxes.

Comollo eliminated natural and some synthetic elastomer from the chewing gum base, and substituted in their place one or more non-tacky synthetic elastomers such as polyisobutylene, polyisoprene, isobutylene-isoprene copolymer and butadiene-styrene copolymer. Comollo also eliminated the tack-producing natural resins and modified natural resins and used instead relatively high amounts of hydrogenated or partially hydrogenated vegetable oils or animal fats. Finally, Comollo completely excluded waxes from the gum base, but included polyvinyl acetate, fatty acids, and mono and diglycerides of fatty acids.

There is therefore a need for a method for removing wax from gum bases without compromising the characteristics of the resultant gum. Likewise, there is a need for a gum base not having wax, but exhibiting the characteristics of gum bases that do include wax.

In constructing bubble gum bases, typically, such bases contain elastomers, elastomer plasticizers, fillers, softeners, waxes, and other optional ingredients such as colorants and antioxidants. Softeners typically used in gum base include hydrogenated vegetable oils, fatty acid esters, acetylated fatty acid esters, acetylated fatty acid esters, glycerol triacetate, and the like. Generally, glycerol triacetate and acetylated fatty acid esters such as acetylated mono-, di-, and tri-glycerides are used to soften vinyl polymers, in particular, polyvinyl acetate.

It has been found that in at least some experimental wax-free gum bases that were constructed that blocking (agglomeration of pelletized base while stored in a package) occurred. To prevent blocking, shipping and storage of the product in refrigerated areas was suggested. It was believed that a temperature of around 10° to 12° C. would prevent such blocking.

However, even under such conditions, certain gum bases still agglomerate. Rheological glass transition (Tg) temperatures (the temperature at which cold-flow or deformation may begin to occur) of certain gum bases indicated that shipping and storage temperatures of at least 6° to 10° C. would be required, instead of 10° to 12° C., to prevent blocking. Such shipping and storage temperatures are not cost effective. In fact, such temperatures may not be possible when shipping in, or to, certain locations.

There is therefore a need for improved wax-free chewing gum bases.

SUMMARY OF THE INVENTION

The present invention is directed to improved wax-free chewing and bubble gum bases and methods of making same. The gum bases of the present invention are substantially free of wax but have been modified to increase the glass transition of the bases. To this end, it has been found that by removing at least one vinyl polymer softener from the wax-free gum base, the glass transition temperature of gum base can be raised to a temperature wherein even at elevated ambient temperatures blocking (agglomeration) does not occur.

The vinyl polymer softeners that can be eliminated, or at least substantially reduced, from the gum bases to increase the glass transition temperature pursuant to the present invention include, but are not limited to: benzyl benzoate; benzyl butyrate; benzyl phenol acetate; acetyl triethyl cidrate; diethyl malonate; ethyl oleate; sucrose octaacetate; diacetyl tartaric acid ester of mono- and di-glycerides; stearyl monoglyceridyl citrate; succinylated glycerides; lactylic and glyceryl lacto esters of fatty acids; butyl-2-decenoate; citronellyl butyrate; cresyl acetate; ethyl acetate; diethyl malonate; diethyl sebacate; triethyl citrate; diethyl suacinate; glycerol tributyrate; ethyl laurate; ethyl acetoacetate; diethyl tartrate; glycerol triacetate; and ethyl or butyl lactate.

To this end, the present invention provides a wax-free gum base comprising an elastomer, a vinyl polymer, and an elastomer plasticizer. The base is substantially free of the above mentioned vinyl polymer softeners. As a result, the chewing gum base has a glass transition temperature that is greater than a substantially identical gum base that includes a greater amount of vinyl polymer softener.

In an embodiment, an improved wax-free vinyl polymeric bubble gum base is provided comprising, in an embodiment, by weight percent: from about 10 to about 50 percent vinyl polymer; from about 5 to about 30 percent soft elastomer; from about 5 to about 40 percent filler; from about 8 to about 30 percent elastomer plasticizer; and from about 1 to about 20 percent softeners. The gum base is substantially free of glycerol triacetate softener. This causes the gum base to be resistant to deformation at elevated environmental or ambient temperatures.

In a preferred embodiment, the wax-free bubble gum base contains polyvinyl acetate (PVAc) and is free of terpene resin and of hard elastomer.

In an embodiment, the base is a bubble gum base.

In an embodiment, acetylated glycerides are used as PVAc softeners.

The wax-free bubble gum base of the present invention, that is also free of the above identified vinyl polymer softeners has a higher rheological glass transition (Tg) temperature than gum bases that are free of wax, but contain said softeners. Thus, the gum base may be stored at higher environmental or ambient temperatures without deformation occurring.

Additionally, a method for increasing the glass transition temperature of a gum base is provided. Pursuant to the present invention, a method is provided comprising the step of creating a gum base from at least an elastomer, an elastomer plasticizer, and a vinyl polymer. However, the gum base does not include a wax or said softeners.

The present invention also provides in an embodiment, a method for creating chewing gum comprising the steps of: providing a chewing gum base that does not include a wax or a vinyl polymer softener chosen from the group consisting of: benzyl benzoate; benzyl butyrate; benzyl phenol acetate; acetyl triethyl citrate; diethyl malonate; ethyl oleate; sucrose octaacetate; diacetyl tartaric acid ester of mono- and di-glycerides; stearyl monoglyceridyl citrate; succinylated glycerides; lactylic and glyceryl lacto esters of fatty acids; butyl-2-decenoate; citronellyl butyrate; cresyl acetate; ethyl acetate; diethyl malonate; diethyl sebacate; triethyl citrate; diethyl succinate; glycerol tributyrate; ethyl laurate; ethyl acetoacetate; diethyl tartrate; glycerol triacetate; and ethyl or butyl lactate; and adding to the chewing gum base, a water soluble gum portion.

In an embodiment of the method, a vinyl polymer softener such as glycerol triacetate is added to the chewing gum base before the water soluble portion is added.

It is an advantage of the invention to provide a substantially wax-free gum base.

It is an advantage of the invention to provide a gum base that does not include wax but that can be shipped and stored without greatly reduced refrigeration temperatures.

It is another advantage of the invention to provide a gum base that does not include wax but that has a sufficiently high glass transition temperature.

It is an advantage of the invention to provide a wax-free gum base having improved homogeneity during gum base and bubble gum processing.

It is further an advantage of the invention to provide a wax-free gum base having improved processing characteristics and improved physical characteristics when the gum base sets up after processing.

It is furthermore an advantage of the invention to provide a wax-free gum base having better flexibility with respect to the addition of other gum base ingredients that are added during processing.

It is another advantage of the invention to provide a wax-free bubble gum base having a higher glass transition temperature than substantially similar wax-free bubble gum bases.

It is also an advantage of the invention to provide a suitably soft gum base wherein wax is not needed to soften the gum base.

It is also an advantage of the invention to improve the compatibility of gum base ingredients during the blending process.

It is also an advantage of the present invention to provide an improved wax-free bubble gum base.

It is an advantage of the invention to provide an improved chewing gum which contains the wax-free chewing gum base of the invention.

It is also an advantage of the invention to provide an improved chewing gum made from the wax-free base which does not retain the amount of flavor typical sugarless gums retain after chewing.

It is also an advantage of the invention to provide an improved chewing gum that hydrates better during about one to three minutes of chewing.

It is a further advantage of the present invention to provide a method for eliminating wax from a gum base and still provide a gum base that can create a resultant gum product having the characteristics of a gum product that includes wax.

It is an advantage of the present invention to provide a wax free gum base that can be used to create a chewing gum that has chew characteristics at least as good as chewing gum created from wax containing gum bases.

It is an advantage of the present invention to provide a gum base that is free of wax but when used to create a chewing gum has improved flavor release.

The foregoing and other features and advantages will become further apparent from the following detailed description of the presently preferred embodiments, when read in conjunction with the accompanying examples. It should be understood that the detailed description and examples are illustrative rather than limitative, the scope of the present invention being defined by the appended claims and equivalents thereof.

DETAILED DESCRIPTION OF THE PRESENTLY PREFERRED EMBODIMENTS

Figure 1:
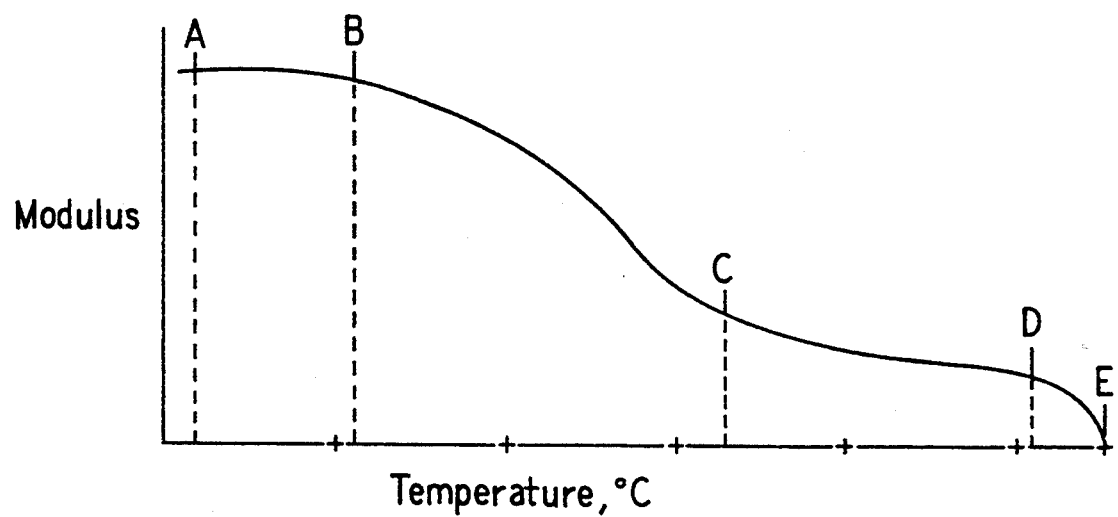
FIG. 1 illustrates, graphically, temperature versus modulus for a typical gum base.

Cold flow is a change in the physical shape (deformation) of a gum base. Cold flow occurs when the ambient temperature exceeds the glass transition (Tg) temperature of the gum base.

Cold flow causes independent gum base pellets or slabs, to join or fuse together so that individual slabs or pellets cannot be removed from their container or carton. Pelletized, or slab poured, gum base that is stored, or shipped, at temperatures above its glass transition temperature can deform. Subjected to gravitational forces, these slabs or pellets agglomerate, or mass together, with other pellets or slabs.

As used herein, glass transition temperature is the rheologically determined temperature at which cold flow may begin to occur. The temperature at which the ratio of the storage modulus G' and the loss modulus G" equals one is the glass transition temperature. As G' drops below G", the base will become primarily viscous and will exhibit flow behavior.

Although, as set forth in detail below, it has been discovered how to remove wax from gum bases, this has raised an issue with respect to at least certain bubble gum bases. Specifically, it has been found that certain experimental wax-free bubble gum bases agglomerate at ambient temperatures at which wax containing bubble gum bases did not.

It has been discovered that the unexpected agglomeration phenomenon is due to the fact that the glass transition temperature of such bases is reduced. Further, as set forth in detail below, it has been discovered how this problem can be remedied. Specifically, it has been found that by removing, or at least substantially reducing, vinyl polymer softeners from the gum base, the resultant gum base will have a higher glass transition temperature. The gum base, with higher glass transition temperature is thereby able to withstand higher ambient temperatures without deformation.

For example, the glass transition temperature can be increased by not using, or at least substantially reducing, vinyl polymer softeners such as: benzyl benzoate; benzyl butyrate; benzyl phenol acetate; acetyl triethyl citrate; diethyl malonate; ethyl oleate; sucrose octaacetate; diacetyl tartaric acid ester of mono- and di-glycerides; stearyl monoglyceridyl citrate; succinylated glycerides; lactylic and glyceryl lacto esters of fatty acids; butyl-2-decenoate; citronellyl butyrate; cresyl acetate; ethyl acetate; diethyl malonate; diethyl sebacate; triethyl citrate; diethyl succinate; glycerol tributyrate; ethyl laurate; ethyl acetoacetate; diethyl tartrate; glycerol triacetate; and ethyl or butyl lactate in the gum base.

Generally, the gum bases of the present invention can comprise a variety of formulations. In a preferred embodiment, the gum base is a bubble gum base.

Generally, in accordance with the invention, a gum base is provided for use in either non-tack or conventional chewing gum, which may be either bubble gum or chewing gum.

In an embodiment, the gum base of the present invention contains about 10 to about 50 weight percent vinyl polymer, 5 to about 30 weight percent soft elastomer, about 8 to about 30 weight percent elastomer plasticizer, about 5 to about 40 weight percent filler, about 1 to about 20 weight percent softener, and optional minor amounts (about one percent or less) of miscellaneous ingredients such as colorants, antioxidants, etc. The gum base is substantially free of the vinyl polymer softeners noted above. Thereby, the gum base has an increased glass transition temperature and is resistant to deformation at elevated ambient temperatures.

Elastomers provide the rubbery cohesive nature of the chewing gum. The characteristic varies depending on the elastomer's chemical structure and how it is blended with other ingredients. Both synthetic and natural elastomers can be used.

Synthetic elastomers may include, but are not limited to, polyisobutylene with GPC weight average molecular weight of about 10,000 to about 95,000, isobutylene-isoprene copolymer (butyl elastomer), styrene-butadiene copolymers having styrene-butadiene ratios of about 1:3 to about 3:1, polyvinyl acetate having GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof.

Preferred ranges are, for polyisobutylene, 50,000 to 80,000 GPC weight average molecular weight, for styrene-butadiene, 1:1 to 1:3 bound styrene-butadiene, for polyvinyl acetate, 10,000 to 65,000 GPC weight average molecular weight with the higher molecular weight polyvinyl acetates typically used in bubble gum base, and for vinyl acetate-vinyl laurate, vinyl laurate content of 10–45 percent.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta percha, gutta kataiu, niger gutta, tunu, chilte, chiquibul, gutta hang kang, and combinations thereof. The preferred synthetic elastomer and natural elastomer concentrations vary depending on whether the chewing gum in which the base is used is adhesive or conventional, bubble gum or regular gum, as discussed below. The preferred natural elastomers are jelutong, chicle, sorva and massaranduba balata.

In an embodiment, the preferred elastomers for use in the present invention include, but are not limited to, vinyl polymers such as polyvinyl acetate and soft elastomers such as polyisobutylenes. The soft elastomers may comprise, in an embodiment, from about 5 to about 30 percent by weight, and in a preferred embodiment, from about 7 to about 20 percent by weight.

The types of vinyl polymers that, in an embodiment, may be used in the present invention are these having GPC molecular weights greater than 2000. Preferably, the vinyl polymers have a GPC molecular weight greater than 20,000 and more preferably, from about 28,000 to about 70,000 and is of the polyvinyl acetate type.

In an embodiment, the vinyl polymers are vinyl laurate/vinyl acetate. The types of vinyl laurate/vinyl acetate preferred are those having a vinyl laurate content greater than 10 and preferably from about 15 to about 45.

The types of soft elastomers suitable for the present invention are those having GPC molecular weight greater than 2000. Preferably, the soft elastomers have a GPC molecular weight of from 60000 to about 80000 and more preferably, the soft elastomer within this range is of the polyisobutylene type. The soft elastomers may be present from about 1 to about 20 percent by weight and preferably from about 5 to about 15 percent by weight.

Elastomer plasticizers vary the firmness of the gum base. The rubber plasticizing strength of elastomer plasticizers and their varying softening points cause various degrees of finished gum firmness when used in gum base. This is important when one wishes to use flavors that differ in plasticizing strength of the gum base in finished gum.

Elastomer plasticizers may include, but are not limited to, natural rosin esters such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing. The preferred elastomer plasticizers will also vary depending on the specific application, and on the type of elastomer which is used.

Elastomer plasticizers, in an embodiment, can comprise preferably approximately 8 to about 30 weight percent of the gum base. In a preferred embodiment, the elastomer plasticizers comprise approximately 12 to about 25% by weight.

Fillers modify the texture of the base and aid in processing. Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Fillers can comprise from 0 to 50 percent by weight of the gum base. In a preferred embodiment, fillers comprise approximately 25 to about 45 percent by weight.

Softeners modify the texture and cause the hydrophobic and hydrophilic components of the base/chewing gum to be miscible. Softeners/emulsifiers may include: benzyl benzoate, benzyl butyrate, benzyl phenol acetate, acetyl triethyl citrate, diethyl malonate, ethyl oleate, sucrose octaacetate, diacetyl tartaric acid ester of mono- and di-glycerides, stearyl monoglyceridyl citrate, succinylated glycerides, lactylic and glyceryl lacto esters of fatty acids, butyl-2-decenoate, citronellyl butyrate, cresyl acetate, ethyl acetate, diethyl malonate, diethyl sebacate, triethyl citrate, diethyl succinate, glycerol tributyrate, ethyl laurate, ethyl acetoacetate, diethyl tartrate, glycerol triacetate, ethyl or butyl lactate, tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof. Hydrogenated vegetable oils are generally preferred, either alone or in combination with other softeners. As discussed in detail below, the selection and amount of oils has been determined to, at least with respect to certain bases and at least in part, compensate for the removal of wax.

The preferred softeners for the present invention are fatty acid esters of glycerides acetylated glycerides and vegetable oils, all having as their main component fatty acids with carbon chain lengths greater than 12 carbons. More preferable, in an embodiment, is the use of acetylated monoglycerides having as their main component fatty acids with carbon chain lengths greater than 14 carbons. It is further preferred to use acetylated monoglycerides that are greater than 50% acetylated.

The aforementioned softeners suitable for the present invention may range from about 1 to about 20 percent by weight of the gum base. Preferably, the softeners range from about 5 to 18 percent by weight of the base. This depends on the level and type of vinyl polymer used. A ratio of total vinyl polymer to total softener generally is from about 45:1 to about 2:1 and preferably from about 16:1 to about 3:1, and preferably from 10:1 to about 8:1.

Vinyl polymer softeners, such as benzyl benzoate, benzyl butyrate, benzyl phenol acetate, acetyl triethyl citrate, diethyl malonate, ethyl oleate, sucrose octaacetate, diacetyl tartaric acid ester of mono- and di-glycerides, stearyl monoglyceridyl citrate, succinylated glycerides, lactylic and glyceryl lacto esters of fatty acids, butyl-2-decenoate, citronellyl butyrate, cresyl acetate, ethyl acetate, diethyl malonate, diethyl sebacate, triethyl citrate, diethyl succinate, glycerol tributyrate, glycerol triacetate, ethyl laurate, ethyl acetoacetate, diethyl tartrate and ethyl or butyl lactate, by way of the present invention, are eliminated, or used at substantially reduced levels, in the gum base. The result is improved cold-flow resistance at elevated environmental or ambient temperatures.

However, the addition of the above vinyl polymer softeners, such as glycerol triacetate, during bubble gum or chewing gum manufacture is still possible. With respect to glycerol triacetate, as well as the above-identified softeners, because glycerol triacetate is not present in the gum base, the gum base of the present invention can be stored at elevated temperatures. Glycerol triacetate, or other vinyl polymer softeners, can then be added during the gum making process. This may be desirable in an effort to further soften the chewing gum itself. However, the disadvantages of having glycerol triacetate in a wax-free gum base will not be present using this method.

Although it is believed that waxes may aid in the curing of the chewing gum made from the gum base, as well as improve the release of flavor, shelf-life and texture, it has also been found that the elimination of wax from the gum base decreases its glass transition temperature. For purposes of gum processing wherein the gum base needs to be softened and pumped into a gum mixer, this type of gum base with a lower glass transition temperature would require less heat to soften and its softness can be maintained at less cost. During the molten base state, wax, since it is not present, cannot separate from the other base ingredients as previously mentioned.

The waxes eliminated from the present invention include synthetic waxes such as polyethylene and Fischer-Tropsch waxes, natural waxes such as candelilla, carnauba, beeswax, rice bran, petroleum waxes such as microcrystalline and paraffin and mixtures thereof.

Antioxidants prolong shelf-life and storage of gum base, finished gum and their respective components including fats and flavor oils. Antioxidants suitable for use in the gum base include butylated hydroxyanisole (BHA), butylated hydroxytoluene (BHT), beta-carotenes, tocopherols, acidulants such as Vitamin C, propyl gallate, other synthetic and natural types or mixtures thereof.

Antioxidants may be used at a range of about 0 to about 10 percent by weight, of the gum base, depending on the type. Preferably, in an embodiment, antioxidants comprise from about 0 to about 0.1 percent by weight.

Colorants impart desired color characteristics or remove undesired color by whitening the base. Colorants and whiteners may include FD&C-type dyes and lakes, fruit and vegetable extracts, titanium dioxide, and combinations thereof. Colorants may range from 0 to about 5 percent by weight of the gum base. Preferably, colorants range from 0 to about 1 percent by weight.

When the wax-free gum base of the invention is to be used in a chewing gum which has at least some adhesive (reduced tack) characteristics, the base should preferably contain about 10 to about 40 weight percent synthetic elastomer, about 15 to about 30 weight percent elastomer plasticizer, about 5 to about 30 weight percent filler, about 15 to about 35 weight percent softener, 0 to about 1 weight percent colorant and 0 to about 0.1 weight percent antioxidant. By way of example, specific embodiments of the wax-free gum base are provided in Examples 1–30 below.

TABLE 1

WAX-FREE GUM BASES FOR USE IN CHEWING GUM HAVING SOME REDUCED TACK CHARACTERISTICS (EXAMPLES 1-30)

EXAMPLES 1-4

| GENERIC INGREDIENTS | 1 | 2 | 3 | 4 |
|---|---|---|---|---|
| SYNTHETIC ELASTOMER | | | | |
| STYRENE-BUTADIENE ELASTOMER | 5.3 | — | 2.1 | 1.3 |
| BUTYL (ISOPRENE-ISOBUTYLENE) ELASTOMER | 8.6 | 7.9 | 7.2 | 14.8 |
| POLYISOBUTYLENE ELASTOMER | 7.1 | — | 7.4 | 5.2 |
| POLYVINYL ACETATE | 10.5 | 27.2 | 15.3 | 11.7 |
| ELASTOMER PLASTICIZERS | | | | |
| GLYCEROL ESTERS OF ROSIN | 2.1 | — | 19.0 | — |
| GLYCEROL ESTERS OF PART HYD ROSIN | 4.3 | 18.2 | — | 15.3 |
| TERPENE RESINS | 10.8 | — | — | — |
| FILLER | | | | |
| CALCIUM CARBONATE | — | 15.9 | 20.7 | — |
| TALC | 25.5 | — | — | 17.1 |
| SOFTENER | | | | |
| HYDROGENATED VEGETABLE OIL | 15.3 | 22.6 | 24.3 | 28.4 |
| GLYCEROL MONOSTEARATE | 8.2 | 7.4 | 4.0 | 5.1 |
| LECITHIN | 2.3 | 0.8 | — | 1.1 |
| TOTAL PERCENT | 100.0 | 100.0 | 100.0 | 100.0 |

EXAMPLES 5-8

| GENERIC INGREDIENTS | 5 | 6 | 7 | 8 |
|---|---|---|---|---|
| SYNTHETIC ELASTOMER | | | | |
| STYRENE-BUTADIENE ELASTOMER | 1.8 | — | — | — |
| BUTYL (ISOPRENE-ISOBUTYLENE) ELASTOMER | — | 8.1 | 14.6 | 9.4 |
| POLYISOBUTYLENE ELASTOMER | 24.8 | 3.6 | 1.2 | 13.0 |
| POLYVINYL ACETATE | 10.1 | 27.3 | 26.2 | 22.3 |
| ELASTOMER PLASTICIZERS | | | | |
| GLYCEROL ESTERS OF ROSIN | 3.7 | — | 4.9 | — |
| GLYCEROL ESTERS OF PART HYD ROSIN | 7.9 | — | 12.6 | — |
| TERPENE RESINS | 7.1 | 26.8 | — | 10.0 |
| FILLER | | | | |
| CALCIUM CARBONATE | 17.7 | 11.4 | — | 20.0 |
| TALC | — | — | 13.1 | — |
| SOFTENER | | | | |
| HYDROGENATED VEGETABLE OIL | 21.0 | 14.3 | 16.6 | 20.7 |
| GLYCEROL MONOSTEARATE | 3.5 | 4.8 | 9.6 | 4.6 |
| LECITHIN | 2.4 | 3.7 | 1.2 | — |
| TOTAL PERCENT | 100.0 | 100.0 | 100.0 | 100.0 |

EXAMPLES 9-12

| GENERIC INGREDIENTS | 9 | 10 | 11 | 12 |
|---|---|---|---|---|
| SYNTHETIC ELASTOMER | | | | |
| STYRENE-BUTADIENE ELASTOMER | 5.2 | 2.1 | 4.3 | 5.9 |
| BUTYL (ISOPRENE-ISOBUTYLENE) ELASTOMER | 4.1 | 7.2 | 6.2 | 6.9 |
| POLYISOBUTYLENE ELASTOMER | 5.9 | 7.3 | 6.4 | 2.0 |
| POLYVINYL ACETATE | 25.7 | 15.3 | 21.8 | 24.8 |
| ELASTOMER PLASTICIZERS | | | | |
| GLYCEROL ESTERS OF ROSIN | 23.5 | 19.1 | 2.6 | 8.6 |
| GLYCEROL ESTERS OF PART HYD ROSIN | — | — | — | 8.0 |
| TERPENE RESINS | 3.2 | — | 17.1 | 1.9 |
| FILLER | | | | |
| CALCIUM CARBONATE | 15.1 | 20.7 | — | 9.9 |
| TALC | — | — | 14.6 | 7.2 |
| SOFTENER | | | | |
| HYDROGENATED VEGETABLE OIL | 12.2 | 24.3 | 19.5 | 21.1 |
| GLYCEROL MONOSTEARATE | 5.1 | 4.0 | 4.4 | 3.7 |
| LECITHIN | — | — | 3.1 | — |
| TOTAL PERCENT | 100.0 | 100.0 | 100.0 | 100.0 |

EXAMPLES 13-16

| GENERIC INGREDIENTS | 13 | 14 | 15 | 16 |
|---|---|---|---|---|
| SYNTHETIC ELASTOMER | | | | |
| STYRENE-BUTADIENE ELASTOMER | 3.9 | — | 2.1 | 1.6 |
| BUTYL (ISOPRENE-ISOBUTYLENE) ELASTOMER | 5.3 | 9.3 | 6.0 | 3.7 |
| POLYISOBUTYLENE ELASTOMER | 12.7 | 12.0 | 8.5 | 6.8 |
| POLYVINYL ACETATE | 14.9 | 21.0 | 15.3 | 22.3 |
| ELASTOMER PLASTICIZERS | | | | |
| GLYCEROL ESTERS OF ROSIN | — | — | 10.1 | 9.9 |
| GLYCEROL ESTERS OF PART HYD ROSIN | — | — | 8.9 | 4.3 |
| TERPENE RESINS | 21.4 | 6.3 | — | 11.6 |
| FILLER | | | | |
| CALCIUM CARBONATE | 13.7 | 21.0 | 20.9 | — |
| TALC | 1.4 | — | — | 17.2 |
| SOFTENER | | | | |
| HYDROGENATED VEGETABLE OIL | 18.7 | 25.0 | 24.2 | 17.8 |
| GLYCEROL MONOSTEARATE | 5.7 | 3.0 | 4.0 | 4.8 |
| LECITHIN | 2.3 | — | — | — |
| TOTAL PERCENT | 100.0 | 100.0 | 100.0 | 100.0 |

EXAMPLES 17-20

| GENERIC INGREDIENTS | 17 | 18 | 19 | 20 |
|---|---|---|---|---|
| SYNTHETIC ELASTOMER | | | | |
| STYRENE-BUTADIENE ELASTOMER | — | 2.7 | — | — |
| BUTYL (ISOPRENE-ISOBUTYLENE) ELASTOMER | 8.1 | 2.3 | 8.9 | 3.6 |
| POLYISOBUTYLENE ELASTOMER | 3.6 | 14.2 | 10.0 | 11.1 |
| POLYVINYL ACETATE | 27.3 | 17.3 | 21.3 | 21.9 |
| ELASTOMER PLASTICIZERS | | | | |
| GLYCEROL ESTERS OF ROSIN | — | — | — | 19.6 |
| GLYCEROL ESTERS OF PART HYD ROSIN | — | 27.3 | — | 11.2 |
| TERPENE RESINS | 26.9 | — | 9.7 | 3.7 |

TABLE 1-continued
WAX-FREE GUM BASES FOR USE IN CHEWING GUM HAVING SOME REDUCED TACK CHARACTERISTICS (EXAMPLES 1–30)

| ** FILLER ** | | | | |
|---|---|---|---|---|
| CALCIUM CARBONATE | 11.3 | — | 21.5 | 6.4 |
| TALC | — | 8.2 | — | — |
| ** SOFTENER ** | | | | |
| HYDROGENATED VEGETABLE OIL | 14.3 | 22.4 | 23.2 | 19.2 |
| GLYCEROL MONOSTEARATE | 4.8 | 2.7 | 5.4 | 3.3 |
| LECITHIN | 3.7 | 2.9 | — | — |
| TOTAL PERCENT | 100.0 | 100.0 | 100.0 | 100.0 |

EXAMPLES 21–24

| GENERIC INGREDIENTS | 21 | 22 | 23 | 24 |
|---|---|---|---|---|
| ** SYNTHETIC ELASTOMER ** | | | | |
| STYRENE-BUTADIENE ELASTOMER | — | 1.4 | 3.2 | — |
| BUTYL (ISOPRENE-ISOBUTYLENE) ELASTOMER | 7.4 | 8.4 | 7.3 | 8.8 |
| POLYISOBUTYLENE ELASTOMER | 1.9 | 1.6 | 7.5 | 3.5 |
| POLYVINYL ACETATE | 24.8 | 23.1 | 21.1 | 27.9 |
| ** ELASTOMER PLASTICIZERS ** | | | | |
| GLYCEROL ESTERS OF ROSIN | — | 13.1 | 15.3 | — |
| GLYCEROL ESTERS OF PART HYD ROSIN | — | 22.1 | 2.4 | — |
| TERPENE RESINS | 25.8 | 3.6 | 5.8 | 27.4 |
| ** FILLER ** | | | | |
| CALCIUM CARBONATE | 18.6 | — | — | 11.9 |
| TALC | — | 7.3 | 14.8 | — |
| ** SOFTENER ** | | | | |
| HYDROGENATED VEGETABLE OIL | 12.3 | 11.3 | 19.8 | 12.3 |
| GLYCEROL MONOSTEARATE | 4.4 | 4.4 | 2.8 | 4.7 |
| LECITHIN | 4.8 | 3.7 | — | 3.5 |
| TOTAL PERCENT | 100.0 | 100.0 | 100.0 | 100.0 |

EXAMPLES 25–28

| GENERIC INGREDIENTS | 25 | 26 | 27 | 28 |
|---|---|---|---|---|
| ** SYNTHETIC ELASTOMER ** | | | | |
| STYRENE-BUTADIENE ELASTOMER | 4.1 | — | — | — |
| BUTYL (ISOPRENE-ISOBUTYLENE) ELASTOMER | 11.3 | 10.0 | 9.2 | 2.4 |
| POLYISOBUTYLENE ELASTOMER | 7.9 | 1.9 | 6.3 | 8.4 |
| POLYVINYL ACETATE | 18.2 | 27.6 | 13.1 | 20.5 |
| ** ELASTOMER PLASTICIZERS ** | | | | |
| GLYCEROL ESTERS OF ROSIN | — | — | — | — |
| GLYCEROL ESTERS OF PART HYD ROSIN | 26.2 | — | 19.9 | — |
| TERPENE RESINS | 1.4 | 25.3 | — | 23.5 |
| ** FILLER ** | | | | |
| CALCIUM CARBONATE | 13.6 | 11.3 | 22.3 | — |
| TALC | — | — | — | 15.6 |
| ** SOFTENER ** | | | | |
| HYDROGENATED VEGETABLE OIL | 8.2 | 15.4 | 18.6 | 19.2 |
| GLYCEROL MONOSTEARATE | 5.2 | 4.8 | 10.6 | 8.9 |
| LECITHIN | 3.9 | 3.7 | — | 1.5 |
| TOTAL PERCENT | 100.0 | 100.0 | 100.0 | 100.0 |

EXAMPLES 29–30

| GENERIC INGREDIENTS | 29 | 30 |
|---|---|---|
| ** SYNTHETIC ELASTOMER ** | | |
| STYRENE-BUTADIENE ELASTOMER | — | — |
| BUTYL (ISOPRENE-ISOBUTYLENE) ELASTOMER | 8.3 | 8.8 |
| POLYISOBUTYLENE ELASTOMER | 3.6 | 2.3 |
| POLYVINYL ACETATE | 27.5 | 27.4 |
| ** ELASTOMER PLASTICIZERS ** | | |
| GLYCEROL ESTERS OF ROSIN | — | — |
| GLYCEROL ESTERS OF PART HYD ROSIN | — | — |
| TERPENE RESINS | 25.3 | 28.3 |
| ** FILLER ** | | |
| CALCIUM CARBONATE | 11.3 | 12.5 |
| TALC | — | — |
| ** SOFTENER ** | | |
| HYDROGENATED VEGETABLE OIL | 16.5 | 12.5 |
| GLYCEROL MONOSTEARATE | 4.8 | 4.7 |
| LECITHIN | 2.7 | 3.5 |
| TOTAL PERCENT | 100.0 | 100.0 |

When the wax-free gum base of the invention is to be used in a chewing gum which does not have adhesive characteristics, the base should preferably contain about 12 to about 30 weight percent natural elastomer, about 20 to about 40 weight percent synthetic elastomer, about 4 to about 25 weight percent elastomer plasticizer, about 5 to about 25 weight percent filler, about 15 to about 30 weight percent softener, 0 to about 0.1 weight percent colorant and 0 to about 0.1 weight percent antioxidant. By way of example, specific embodiments of the wax-free gum base fitting this description are provided in Examples 31–55 below:

TABLE 2
WAX-FREE GUM BASES FOR USE IN CHEWING GUM HAVING SOME REDUCED TACK CHARACTERISTICS (EXAMPLES 31–55)

EXAMPLES 31–34

| GENERIC INGREDIENTS | 31 | 32 | 33 | 34 |
|---|---|---|---|---|
| ** NATURAL ELASTOMER ** | | | | |
| NATURAL GUM | 22.0 | 26.5 | 23.4 | 25.1 |
| ** SYNTHETIC ELASTOMER ** | | | | |
| STYRENE-BUTADIENE ELASTOMER | — | — | — | 1.9 |
| BUTYL (ISOPRENE-ISOBUTYLENE) ELASTOMER | 4.8 | 7.1 | 5.6 | 2.1 |
| POLYISOBUTYLENE ELASTOMER | 5.7 | 5.6 | 3.0 | 4.7 |
| POLYVINYL ACETATE | 16.4 | 18.7 | 19.8 | 24.8 |
| ** ELASTOMER PLASTICIZERS ** | | | | |
| GLYCEROL ESTERS OF ROSIN | 3.8 | — | — | 3.2 |
| GLYCEROL ESTERS OF PART HYD ROSIN | 12.3 | 15.3 | 15.9 | 12.6 |
| METHYL ESTERS OF ROSIN | — | — | — | 2.1 |
| TERPENE RESINS | — | — | — | — |
| ** FILLER ** | | | | |
| CALCIUM CARBONATE | — | 4.0 | 10.7 | 4.4 |
| TALC | 7.1 | — | — | — |
| ** SOFTENER ** | | | | |
| HYDROGENATED VEGETABLE OIL | 21.8 | 18.4 | 16.8 | 12.6 |
| GLYCEROL MONOSTEARATE | 6.1 | 4.4 | 4.8 | 3.8 |
| LECITHIN | — | — | — | 2.7 |
| TOTAL PERCENT | 100.0 | 100.0 | 100.0 | 100.0 |

TABLE 2-continued

WAX-FREE GUM BASES FOR USE IN CHEWING GUM HAVING SOME REDUCED TACK CHARACTERISTICS (EXAMPLES 31-55)

EXAMPLES 35-38

| GENERIC INGREDIENTS | IDENTIFICATION - EXAMPLES #: | | | |
|---|---|---|---|---|
| | 35 | 36 | 37 | 38 |
| ** NATURAL ELASTOMER ** | | | | |
| NATURAL GUM | 22.8 | 18.2 | 23.5 | 17.6 |
| ** SYNTHETIC ELASTOMER ** | | | | |
| STYRENE-BUTADIENE ELASTOMER | 2.6 | — | — | — |
| BUTYL (ISOPRENE-ISOBUTYLENE) ELASTOMER | 4.1 | 6.9 | 8.8 | 10.2 |
| POLYISOBUTYLENE ELASTOMER | 3.2 | 5.4 | 3.3 | 2.1 |
| POLYVINYL ACETATE | 16.3 | 15.2 | 12.9 | 26.9 |
| ** ELASTOMER PLASTICIZERS ** | | | | |
| GLYCEROL ESTERS OF ROSIN | 6.9 | — | 8.65 | 11.7 |
| GLYCEROL ESTERS OF PART HYD ROSIN | 11.8 | 12.5 | 5.5 | 4.8 |
| METHYL ESTERS OF ROSIN | 1.7 | 2.6 | 1.4 | — |
| TERPENE RESINS | — | — | 3.7 | — |
| ** FILLER ** | | | | |
| CALCIUM CARBONATE | 9.3 | 16.0 | — | — |
| TALC | — | — | 9.3 | 4.6 |
| ** SOFTENER ** | | | | |
| HYDROGENATED VEGETABLE OIL | 18.2 | 16.1 | 16.2 | 15.8 |
| GLYCEROL MONOSTEARATE | — | 7.1 | 5.7 | 6.3 |
| LECITHIN | 3.1 | — | 1.2 | — |
| TOTAL PERCENT | 100.0 | 100.0 | 100.0 | 100.0 |

EXAMPLES 39-42

| GENERIC INGREDIENTS | IDENTIFICATION - EXAMPLES #: | | | |
|---|---|---|---|---|
| | 39 | 40 | 41 | 42 |
| ** NATURAL ELASTOMER ** | | | | |
| NATURAL GUM | 12.9 | 18.5 | 15.7 | 22.6 |
| ** SYNTHETIC ELASTOMER ** | | | | |
| STYRENE-BUTADIENE ELASTOMER | — | — | 1.9 | — |
| BUTYL (ISOPRENE-ISOBUTYLENE) ELASTOMER | 9.1 | 6.4 | 3.7 | 5.8 |
| POLYISOBUTYLENE ELASTOMER | 9.4 | 5.2 | 4.1 | 3.1 |
| POLYVINYL ACETATE | 10.7 | 15.4 | 26.2 | 20.4 |
| ** ELASTOMER PLASTICIZERS ** | | | | |
| GLYCEROL ESTERS OF ROSIN | 15.2 | — | — | — |
| GLYCEROL ESTERS OF PART HYD ROSIN | — | 13.2 | 15.3 | 11.7 |
| METHYL ESTERS OF ROSIN | — | 2.0 | — | 4.0 |
| TERPENE RESINS | — | — | — | — |
| ** FILLER ** | | | | |
| CALCIUM CARBONATE | 20.6 | 18.5 | 12.2 | 11.6 |
| TALC | — | — | — | — |
| ** SOFTENER ** | | | | |
| HYDROGENATED VEGETABLE OIL | 15.8 | 13.9 | 15.1 | 17.5 |
| GLYCEROL MONOSTEARATE | 6.3 | 6.9 | 5.8 | 3.3 |
| LECITHIN | — | — | — | — |
| TOTAL PERCENT | 100.0 | 100.0 | 100.0 | 100.0 |

EXAMPLES 43-46

| GENERIC INGREDIENTS | IDENTIFICATION - EXAMPLES #: | | | |
|---|---|---|---|---|
| | 43 | 44 | 45 | 46 |
| ** NATURAL ELASTOMER ** | | | | |
| NATURAL GUM | 23.7 | 22.2 | 21.1 | 22.2 |
| ** SYNTHETIC ELASTOMER ** | | | | |
| STYRENE-BUTADIENE ELASTOMER | — | — | — | — |
| BUTYL (ISOPRENE-ISOBUTYLENE) ELASTOMER | 6.2 | 5.7 | 6.1 | 5.7 |
| POLYISOBUTYLENE ELASTOMER | 5.9 | 3.1 | 2.8 | 3.1 |
| POLYVINYL ACETATE | 23.7 | 22.0 | 18.0 | 22.0 |
| ** ELASTOMER PLASTICIZERS ** | | | | |
| GLYCEROL ESTERS OF ROSIN | — | — | 15.7 | — |
| GLYCEROL ESTERS OF PART HYD ROSIN | 11.3 | 15.2 | — | 13.2 |
| METHYL ESTERS OF ROSIN | 2.9 | — | — | 2.0 |
| TERPENE RESINS | 2.8 | — | — | — |
| ** FILLER ** | | | | |
| CALCIUM CARBONATE | 5.6 | 11.4 | — | 11.3 |
| TALC | — | — | 15.4 | — |
| ** SOFTENER ** | | | | |
| HYDROGENATED VEGETABLE OIL | 12.1 | 17.2 | 15.1 | 17.2 |
| GLYCEROL MONOSTEARATE | 5.8 | 3.3 | 5.8 | 3.3 |
| LECITHIN | — | — | — | — |
| TOTAL PERCENT | 100.0 | 100.0 | 100.0 | 100.0 |

EXAMPLES 47-50

| GENERIC INGREDIENTS | IDENTIFICATION - EXAMPLES #: | | | |
|---|---|---|---|---|
| | 47 | 48 | 49 | 50 |
| ** NATURAL ELASTOMER ** | | | | |
| NATURAL GUM | 23.8 | 28.4 | 18.7 | 19.5 |
| ** SYNTHETIC ELASTOMER ** | | | | |
| STYRENE-BUTADIENE ELASTOMER | — | — | — | — |
| BUTYL (ISOPRENE-ISOBUTYLENE) ELASTOMER | 3.1 | 5.4 | 6.0 | 8.2 |
| POLYISOBUTYLENE ELASTOMER | 7.7 | 3.1 | 5.5 | 2.7 |
| POLYVINYL ACETATE | 20.5 | 26.6 | 14.8 | 17.2 |
| ** ELASTOMER PLASTICIZERS ** | | | | |
| GLYCEROL ESTERS OF ROSIN | — | — | — | 20.0 |
| GLYCEROL ESTERS OF PART HYD ROSIN | 10.4 | 11.4 | 15.5 | — |
| METHYL ESTERS OF ROSIN | 2.0 | — | — | — |
| TERPENE RESINS | 5.1 | — | — | — |
| ** FILLER ** | | | | |
| CALCIUM CARBONATE | — | 9.1 | 17.9 | 9.6 |
| TALC | 5.3 | — | — | — |
| ** SOFTENER ** | | | | |
| HYDROGENATED VEGETABLE OIL | 15.8 | 16.0 | 13.0 | 22.8 |
| GLYCEROL MONOSTEARATE | 6.3 | — | 7.7 | — |
| LECITHIN | — | — | — | — |
| TOTAL PERCENT | 100.0 | 100.0 | 100.0 | 100.0 |

EXAMPLES 51-54

| GENERIC INGREDIENTS | IDENTIFICATION - EXAMPLES #: | | | |
|---|---|---|---|---|
| | 51 | 52 | 53 | 54 |
| ** NATURAL ELASTOMER ** | | | | |
| NATURAL GUM | 14.4 | 18.2 | 25.2 | 25.2 |
| ** SYNTHETIC ELASTOMER ** | | | | |
| STYRENE-BUTADIENE ELASTOMER | — | — | — | — |
| BUTYL (ISOPRENE-ISOBUTYLENE) ELASTOMER | 9.1 | 6.8 | 2.4 | 3.5 |
| POLYISOBUTYLENE | 3.6 | 5.4 | 4.9 | 5.7 |

TABLE 2-continued
WAX-FREE GUM BASES FOR USE IN CHEWING GUM HAVING SOME REDUCED TACK CHARACTERISTICS (EXAMPLES 31-55)

| ELASTOMER | | | | |
|---|---|---|---|---|
| POLYVINYL ACETATE | 18.1 | 15.5 | 19.9 | 19.1 |
| ** ELASTOMER PLASTICIZERS ** | | | | |
| GLYCEROL ESTERS OF ROSIN | 11.9 | — | 15.6 | — |
| GLYCEROL ESTERS OF PART HYD ROSIN | 13.0 | 12.7 | — | 15.6 |
| METHYL ESTERS OF ROSIN | — | 2.6 | — | — |
| TERPENE RESINS | — | — | 2.1 | 1.9 |
| ** FILLER ** | | | | |
| CALCIUM CARBONATE | 14.1 | 15.7 | — | — |
| TALC | — | — | 7.1 | 6.2 |
| ** SOFTENER ** | | | | |
| HYDROGENATED VEGETABLE OIL | 15.8 | 16.0 | 18.4 | 18.4 |
| GLYCEROL MONOSTEARATE | — | 7.1 | 4.4 | 4.4 |
| LECITHIN | — | — | — | — |
| TOTAL PERCENT | 100.0 | 100.0 | 100.0 | 100.0 |

EXAMPLE 55

| GENERIC INGREDIENTS | IDENTIFICATION - EXAMPLES #: 55 |
|---|---|
| ** NATURAL ELASTOMER ** | |
| NATURAL GUM | 26.7 |
| ** SYNTHETIC ELASTOMER ** | |
| STYRENE-BUTADIENE ELASTOMER | — |
| BUTYL (ISOPRENE-ISOBUTYLENE) ELASTOMER | 3.2 |
| POLYISOBUTYLENE ELASTOMER | 6.1 |
| POLYVINYL ACETATE | 17.6 |
| ** ELASTOMER PLASTICIZERS ** | |
| GLYCEROL ESTERS OF ROSIN | — |
| GLYCEROL ESTERS OF PART HYD ROSIN | 15.6 |
| METHYL ESTERS OF ROSIN | — |
| TERPENE RESINS | |
| ** FILLER ** | |
| CALCIUM CARBONATE | — |
| TALC | 8.0 |
| ** SOFTENER ** | |
| HYDROGENATED VEGETABLE OIL | 18.4 |
| GLYCEROL MONOSTEARATE | 2.8 |
| LECITHIN | 1.6 |
| TOTAL PERCENT | 100.0 |

When the wax-free gum base of the invention is to be mused in a bubble gum, in an embodiment, the base should preferably contain about 30 to about 60 weight percent synthetic elastomer, about 5 to about 55 weight percent elastomer plasticizer, about 10 to about 35 weight percent filler, about 5 to about 25 weight percent softener, 0 to about 1 weight percent colorant and 0 to about 0.1 weight percent antioxidant. By way of examples, embodiments of the wax-free base for use in bubble gum are provided in Examples 56-74 below. These examples, however, are not directed to bubble gum bases having improved glass transition temperatures.

TABLE 3
WAX-FREE GUM BASES FOR USE IN BUBBLE GUM (EXAMPLES 56-74)

EXAMPLES 56-59

| GENERIC INGREDIENTS | 56 | 57 | 58 | 59 |
|---|---|---|---|---|
| ** SYNTHETIC ELASTOMER ** | | | | |
| POLYISOBUTYLENE ELASTOMER | 17.1 | 16.7 | 11.7 | 6.2 |
| POLYVINYL ACETATE | 24.9 | 25.6 | 29.4 | 30.9 |
| ** ELASTOMER PLASTICIZERS ** | | | | |
| GLYCEROL ESTERS OF ROSIN | 6.8 | 8.0 | 10.7 | 14.6 |
| GLYCEROL ESTERS OF PART HYD ROSIN | — | — | — | — |
| ** FILLER ** | | | | |
| CALCIUM CARBONATE | — | — | — | — |
| TALC | 34.7 | 34.9 | 34.1 | 34.0 |
| ** SOFTENER ** | | | | |
| GLYCEROL TRIACETATE | 4.6 | 3.9 | 4.4 | 4.7 |
| GLYCEROL MONOSTEARATE | 5.8 | 5.7 | 4.3 | 4.6 |
| ACETYLATED MONOGLYCERIDE | 6.1 | 5.2 | 5.4 | 5.0 |
| TOTAL PERCENT | 100.0 | 100.0 | 100.0 | 100.0 |

EXAMPLES 60-63

| GENERIC INGREDIENTS | 60 | 61 | 62 | 63 |
|---|---|---|---|---|
| ** SYNTHETIC ELASTOMER ** | | | | |
| POLYISOBUTYLENE ELASTOMER | 11.6 | 15.7 | 13.2 | 5.4 |
| POLYVINYL ACETATE | 31.5 | 32.1 | 33.2 | 34.8 |
| ** ELASTOMER PLASTICIZERS ** | | | | |
| GLYCEROL ESTERS OF ROSIN | 19.8 | 27.4 | 22.6 | 16.3 |
| GLYCEROL ESTERS OF PART HYD ROSIN | — | — | — | — |
| ** FILLER ** | | | | |
| CALCIUM CARBONATE | — | — | — | 30.2 |
| TALC | 21.9 | 10.1 | 17.3 | — |
| ** SOFTENER ** | | | | |
| GLYCEROL TRIACETATE | 5.0 | 4.9 | 5.0 | 5.3 |
| GLYCEROL MONOSTEARATE | 4.9 | 4.7 | 4.1 | 5.9 |
| ACETYLATED MONOGLYCERIDE | 5.3 | 5.1 | 4.6 | 2.1 |
| TOTAL PERCENT | 100.0 | 100.0 | 100.0 | 100.0 |

EXAMPLES 64-67

| GENERIC INGREDIENTS | 64 | 65 | 66 | 67 |
|---|---|---|---|---|
| ** SYNTHETIC ELASTOMER ** | | | | |
| POLYISOBUTYLENE ELASTOMER | 7.9 | 17.2 | 13.0 | 11.6 |
| POLYVINYL ACETATE | 34.2 | 37.3 | 37.1 | 39.9 |
| ** ELASTOMER PLASTICIZERS ** | | | | |
| GLYCEROL ESTERS OF ROSIN | 14.8 | 11.2 | — | — |
| GLYCEROL ESTERS OF PART HYD ROSIN | — | — | 19.8 | 19.9 |
| ** FILLER ** | | | | |
| CALCIUM CARBONATE | 29.8 | 20.6 | 16.5 | 15.0 |
| TALC | — | — | — | — |
| ** SOFTENER ** | | | | |
| GLYCEROL TRIACETATE | 5.3 | 5.6 | 5.6 | 6.0 |
| GLYCEROL MONOSTEARATE | 5.0 | 8.1 | 8.0 | 7.6 |
| ACETYLATED MONOGLYCERIDE | 3.0 | — | — | — |
| TOTAL PERCENT | 100.0 | 100.0 | 100.0 | 100.0 |

EXAMPLES 68-71

| GENERIC INGREDIENTS | 68 | 69 | 70 | 71 |
|---|---|---|---|---|
| ** SYNTHETIC ELASTOMER ** | | | | |

TABLE 3-continued
WAX-FREE GUM BASES FOR USE IN BUBBLE GUM (EXAMPLES 56-74)

| POLYISOBUTYLENE ELASTOMER | 11.6 | 7.9 | 11.6 | 10.9 |
|---|---|---|---|---|
| POLYVINYL ACETATE | 41.2 | 34.2 | 37.8 | 37.5 |
| ** ELASTOMER PLASTICIZERS ** | | | | |
| GLYCEROL ESTERS OF ROSIN | — | — | — | — |
| GLYCEROL ESTERS OF PART HYD ROSIN | 19.4 | 14.8 | 19.8 | 20.6 |
| ** FILLER ** | | | | |
| CALCIUM CARBONATE | — | 29.8 | — | — |
| TALC | 14.0 | — | 17.0 | 19.5 |
| ** SOFTENER ** | | | | |
| GLYCEROL TRIACETATE | 6.2 | 5.3 | 5.6 | 5.2 |
| GLYCEROL MONOSTEARATE | 7.6 | 5.0 | 3.2 | 3.1 |
| ACETYLATED MONOGLYCERIDE | — | 3.0 | 5.0 | 3.2 |
| TOTAL PERCENT | 100.0 | 100.0 | 100.0 | 100.0 |

EXAMPLES 72-74

| GENERIC INGREDIENTS | IDENTIFICATION - EXAMPLES #: | | |
|---|---|---|---|
| | 72 | 73 | 74 |
| ** SYNTHETIC ELASTOMER ** | | | |
| POLYISOBUTYLENE ELASTOMER | 11.6 | 11.8 | 11.9 |
| POLYVINYL ACETATE | 33.5 | 35.6 | 37.0 |
| ** ELASTOMER PLASTICIZERS ** | | | |
| GLYCEROL ESTERS OF ROSIN | — | — | — |
| GLYCEROL ESTERS OF PART HYD ROSIN | 19.8 | 19.8 | 20.3 |
| ** FILLER ** | | | |
| CALCIUM CARBONATE | — | — | — |
| TALC | 21.9 | 19.7 | 16.7 |
| ** SOFTENER ** | | | |
| GLYCEROL TRIACETATE | 5.0 | 4.3 | 5.7 |
| GLYCEROL MONOSTEARATE | 2.9 | 2.3 | 4.5 |
| ACETYLATED MONOGLYCERIDE | 5.3 | 6.5 | 3.9 |
| TOTAL PERCENT | 100.0 | 100.0 | 100.0 |

The wax-free gum base of the invention constitutes about 5-95 weight percent of the chewing gum, more typically 10-50 weight percent of the chewing gum, and most commonly 20-35 weight percent of the chewing gum. The gum base is typically prepared by adding an amount of the elastomer, elastomer plasticizers and filler to a heated sigma blade mixer with a front to rear blade speed ratio of typically 2:1. The initial amounts of ingredients are determined by the working capacity of the mixing kettle in order to attain a proper consistency. After the initial ingredients have homogeneously massed, the balance of the elastomer plasticizer, filler, softeners, etc. are added in a sequential manner until a completely homogeneous molten mass is attained. This can usually be achieved in one to four hours, depending on the formulation. The final mass temperature can be between 60° C. and 150° C., more preferably between 70° C. and 120° C. The completed molten mass is emptied from the mixing kettle into coated or lined pans, extruded or cast into any desirable shape and allowed to cool and solidify.

Although the above method for making base is typical and applies to both chewing and bubble gum bases, a preferred method for making a bubble gum base with improved glass transition temperatures, pursuant to the present invention, is as follows.

The gum base of the present invention may be prepared by adding the vinyl polymer, all or part of the filler and all or part of the soft elastomer into a heated sigma blade mixer with a front to rear speed ratio of typically 2:1. The initial amounts of ingredients is determined by the working consistency. After the initial ingredients begin to mass or have homogeneously massed, the balance of the filler, soft elastomer and all or part of the acetylated monoglyceride are added in a sequential manner until a completely homogeneous molten mass is attained.

The acetylated monoglyceride and other softeners may be added at any time during or after the second addition. Preferably, the acetylated monoglyceride is added during the second or third addition to soften the vinyl polymer, uninhibited by other gum base ingredients which may be present. The other softeners are preferably added near the end of the process.

The homogeneity of the final mass may be achieved in one to three hours, depending on the formulation. The final mass temperature can be between 60° C. and 150° C. and preferably between 70° C. and 120° C. The completed molten mass is emptied from the mixing kettle into coated or lined pans, extruded, pelletized or cast into any desirable shape and allowed to cool and solidify.

To the gum base is added a water-soluble portion to create a chewing gum. The water-soluble portion of the chewing gum may comprise softeners, sweeteners, flavoring agents, and combinations thereof.

Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

By way of the present invention, a softener such as glycerol triacetate softener may be added during the process of making the gum containing the gum base of the present invention. The amount of glycerol triacetate added varies depending on the degree of softness desired in the final chewing gum product.

It has been found that when utilizing the gum base of the present invention that the level of glycerol triacetate that, if desired, needs to be added during the gum making process is less than that level necessary if the base contains glycerol triacetate. This is a further advantage of the present invention.

For example, if a gum base containing about 4 percent glycerol triacetate, by weight of the gum base, was used in a gum at a level of 30 percent by weight of the gum, the level of glycerol triacetate present in the gum would be about 1.2 percent. However, lower levels of glycerol triacetate are needed in the gum since gum processing temperatures are much less than base processing temperatures. These lower gum processing temperatures volatilize less glycerol triacetate, leaving more available in the gum to soften the gum base.

Suitable levels of glycerol triacetate to add during the gum making process for the present invention are from about 0.1 percent to about 1.5 percent by weight of the gum. Preferably, in an embodiment, the level of glycerol triacetate in the resultant gum composition is from about 0.3 percent to about 1.3 percent and in an embodiment from about 0.5 percent to about 1.3 percent by weight. In a further preferred embodiment, the chewing gum includes from about 0.5 percent to about 0.9 percent by weight of glycerol triacetate.

The addition of the glycerol triacetate to the gum base may be made at any time during the gum making process. Preferably, the glycerol triacetate is added together or within 5 minutes of when the gum base is added.

There are some variations to the above described preferred method which in no way limit the method as described. Those skilled in the art of gum base manufacture should be able to appreciate such variations.

In producing wax-containing gum bases high in polyvinyl acetate, and particularly those high in high molecular weight polyvinyl acetate, it may be necessary to improve blending of the ingredients by removing the heat applied to the sigma blade mixer at some point in the process. This reduces the temperature of the gum base and causes greater compatibility of its ingredients. In the inventive gum base making process for making the inventive gum base free of wax, there is no need to remove the heat applied. The degree of incompatibility is greatly reduced since there is no wax present.

In addition to the water-insoluble gum base, a typical gum composition includes a water soluble bulk portion and one or more flavoring agents. The wax-free gum base of the invention can be used with any typical chewing gum composition.

The water soluble portion of the gum may include softeners, bulk sweeteners, high intensity sweeteners, flavoring agents and combinations thereof. As noted above, softeners are added to the gum in order to optimize the chewability and mouth feel. The softeners, which are also known as plasticizers or plasticizing agents, generally constitute between about 0.5-15% by weight of the gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5-95% by weight of the gum, more typically 20-80% by weight of the gum and most commonly 30-60% by weight of the gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001-5% by weight of the gum, preferably between 0.01-1% by weight of the gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in gum. The sweetener may also function in the gum in whole or in part as a water soluble bulking agent. Additionally, the softener may also provide additional sweetness such as with aqueous sugar or alditol solutions.

Flavoring agents should generally be present in the gum in an amount within the range of about 0.1-15% by weight of the gum, preferably between about 0.2-5% by weight of the gum, most preferably between about 0.5-3% by weight of the gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

Optional ingredients such as colors, emulsifiers, pharmaceutical agents and additional flavoring agents may also be included in gum.

Chewing or bubble gum is generally manufactured by sequentially adding the various gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further parts of the bulk portion may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

Pursuant to the present invention, methods are provided for eliminating the wax from a gum base yet still providing a gum base that yields a gum having desirable characteristics. Of course, a great number of gum bases are known, many of which have been, or are, commercial products. The inventors believe that the great majority of these bases are wax containing. Indeed, it is further believed that there are only a few specialized formulas that do not contain wax; these formulas having been modified to achieve certain properties at the expense of certain desirable properties that are typically present in a wax containing gum and therefore do not provide a wax-free gum base that can be used to create a gum having characteristics as good as or better than a gum including wax. It would therefore be desirable to provide a method for creating a wax free product in those situations where public perception or regulatory requirements make a wax-free base necessary and/or desirable.

The inventors have found that one method for eliminating wax from a gum base is to eliminate the wax from the typical formula and increase the proportion of at least select oils in the base sufficiently to compensate for the removal of the wax. It is not necessary for a one to one correspondence to be made with respect to the amount of wax deleted and the proportion of oil increased. Rather, in order to afford the necessary characteristics to the resultant gum, the amount and type of oils chosen are selected to create a composition that has chew characteristics, including flavor release, as good as a wax based gum.

More specifically, in an embodiment of the method and composition of the present invention, the amount of and the capillary melting point (CMP) of the oil component are chosen so that the resultant no wax gum base has a softening point lower than that of a corresponding wax containing gum base. The softening point of the base is determined by using ASTM method E28-58T modified whereby the gum base sample is softened in an oven and molded into a shouldered brass ring and trimmed. The sample is placed in a water and glycerine bath and adjusted to a temperature rise of 1° C.±0.25° C. per minute.

By so choosing the oils and reducing the softening point of the base, this provides for a better release of the flavors. It has been found that preferably the oils have a CMP of approximately 40° C. to about 70° C. Preferably, the oils comprise substantially hydrogenated oils. Preferred hydrogenated oils include cottonseed oil (60°-65° C.) and soybean oil (65°- 70° C.). However, other oils can also be used such as canola, safflower, sunflower, palm, and coconut. It has been found that preferably when hydrogenated oils are used, the oils comprise at least 12% by weight of the gum base.

Partially hydrogenated oils can be used in conjunction with the hydrogenated oils. Preferably, the partially hydrogenated oils have melting points of 45°-50° C. In an embodiment, preferably the partially hydrogenated oils are used at 10% or less with respect to the total content of the base.

As used herein, the term "oil" is used broadly and includes hydrogenated oils and those products that technically may be classified as fats.

Additionally, it has been found that the selection of the elastomer plasticizer can contribute and improve the characteristics of a gum base product when the wax is removed. In this regard, the ring and ball softening points (R&B SP) of the elastomer plasticizer may also be important with respect to a no wax product. Preferably, in an embodiment of the no wax gum base of the present invention, the elastomer plasticizer has a R&B SP of about 60° C. to about 135° C. Such elastomer plasticizers include: dimerized rosin ester (80°-130° C.); glycerol ester of rosin (80°-90° C.); glycerol ester of partially hydrogenated rosin (75°-90° C.); and terpene resin (80°-130° C.).

Pursuant to the present invention, a method is provided for removing the wax from a typical wax containing gum base formula. To this end, in an embodiment, when the gum base from which the wax is to be removed originally contains approximately 5% or less wax, in the initial step in the process, the wax is removed from the formula and the other components are increased proportionately. It is not necessary that each component be increased, or that each component be increased to the exact same extent. Rather, at least the majority of the components are increased, and preferably proportionately.

After the reformulation of the gum base, the resultant gum base is then tested. To this end, the gum base can be tested to determine its physical properties, e.g., rheology, to determine if those properties are at least substantially similar to the original wax containing gum base. If desired, the gum base can be used to create a chewing gum. The chewing gum can then be tested to determine if it has chew characteristics that are sufficiently close to, if not better, than a control (a gum created from the original gum base containing wax).

If it is found that the resultant gum does not have sufficiently good chew characteristics, or if the physical properties of the gum base are not satisfactory, then the percent of oil in the gum base is modified. In an embodiment, the percent of oil is not initially modified, but rather, the melting point of the oil is modified. For example, the melting point is increased by adding oils that have a higher melting point and reducing the oils that have a lower melting point. Again, the resultant gum base is tested or a chewing gum is created from the base and the chew characteristics of the gum are tested.

If the gum base, or the chew characteristics of the gum, are still not satisfactory, then further modifications can be made to the percent of oil and/or the melting point of the oil in the gum base. As a further step, the melting point of the elastomer plasticizer in the wax-free base can be modified. It has been found that the melting point of the elastomer plasticizer in the gum base contributes to the chew characteristics. Utilizing these steps, one should be able to eliminate the wax from a gum base without compromising the chew characteristics.

If the gum base originally contains approximately 5% or greater wax content, then the initial step in the process is preferably to eliminate the wax and to increase the oil content proportionately. As previously stated, it is not necessary that the oils be increased in a proportion that corresponds exactly to the original wax content. Rather, the oils are at least increased so as to substantially make up for the elimination of the wax portion. The resultant gum base is then either tested or can then be used to create a chewing gum that is then compared to the control to determine its chew characteristics.

If the characteristics of the resultant gum base are not satisfactory, then the melting point of the oil is modified slightly. Again, to achieve an increase in the melting point in the oil, the oils having a higher melting point, for example, soybean, are increased and the oils having a lower melting point, for example, cotton-seed oil, are reduced.

The gum base is again tested. If it is found that the gum base does not provide satisfactory characteristics, then the melting point of the oil can be further modified.

As an alternative, the proportion of the oil contained in the base can be modified.

If a satisfactory gum base is not created through the step of modifying the melting point of the oil, then the melting point of the elastomer plasticizer is modified.

By using this method, wax can be removed from a gum base that originally contains approximately 5% or greater wax and a wax free gum base can be created that can be used to make a gum having chew characteristics as good as, if not better than, a gum created from a gum base containing wax.

By way of example, and not limitation, examples of wax containing gum bases (controls) are compared to no wax bases that were reformulated from the control formulas pursuant to the present invention will now be given:

EXAMPLES 75-90
I. CHEWING GUMS

| Type: | 75 | 76 | 77 Control |
| --- | --- | --- | --- |

-continued

| | | | |
|---|---|---|---|
| Elastomer | 18.5 | 18.5 | 15.5 |
| PVAc | 13.1 | 13.1 | 13.1 |
| Elastomer Plasticizer | 19.9 | 19.9 | 19.9 |
| Wax | — | — | 19.7 |
| Hyd. Veg. Oil | 13.8 | 13.8 | 6.3 |
| Softening Point | 57° C. | 57° C. | 80° C. |

| Type: | 78 | 79 Control | 80 | 81 Control |
|---|---|---|---|---|
| Elastomer | 11.7 | 11.7 | 12.3 | 12.6 |
| PVAc | 27.3 | 27.3 | 27.4 | 27.4 |
| Elastomer Plasticizer | 26.9 | 26.9 | 27.4 | 25.9 |
| Hyd. Veg. Oil | 14.3 | 2.0 | 12.3 | 3.2 |
| Wax | — | 13.3 | — | 12.4 |
| Softening Point | 56° C. | 70° C. | 60° C. | 73° C. |

| Type: | 82 | 83 | 84 Control | 85 | 86 Control |
|---|---|---|---|---|---|
| Elastomer | 11.1 | 18.9 | 18.7 | 16.7 | 16.7 |
| PVAc | 27.4 | 21.3 | 21.5 | 15.3 | 15.2 |
| Elastomer Plasticizer | 27.4 | 9.7 | 9.6 | 19.0 | 19.1 |
| Hyd. Veg. Oil | 13.6 | 23.2 | 19.5 | 21.4 | 14.3 |
| Wax | — | — | 4.3 | — | 10.0 |
| Softening Point | 53° C. | 57° C. | 63° C. | 59° C. | 67° C. |

| Type: | 87 | 88 Control | 89 | 90 |
|---|---|---|---|---|
| Elastomer | 11.9 | 11.9 | 11.7 | 26.0 |
| PVAc | 27.5 | 27.6 | 27.3 | 21.7 |
| Elastomer Plasticizer | 25.3 | 25.3 | 26.9 | — |
| Wax | — | 14.4 | — | — |
| Hyd. Veg. Oil | 15.5 | 2.0 | 14.2 | 36.4 |
| Softening Point | 57° C. | 65° C. | 59° C. | 64° C. |

EXAMPLES 91–98

| Type: | 91 | 92 Control | 93 | 94 Control |
|---|---|---|---|---|
| Elastomer | 28.8 | 31.3 | 30.3 | 30.5 |
| PVAc | 22.0 | 22.4 | 15.5 | 15.6 |
| Elastomer Plasticizer | — | 13.7 | 15.2 | 14.7 |
| Hyd. Veg. Oil | 17.2 | 4.7 | 16.0 | 5.7 |
| Wax | — | 12.9 | — | 11.9 |
| Softening Point | 53° C. | 58° C. | 51° C. | 56° C. |

| Type: | 95 | 96 Control | 97 | 98 Control |
|---|---|---|---|---|
| Elastomer | 36.87 | 36.9 | 30.2 | 30.9 |
| PVAc | 26.64 | 26.6 | 15.4 | 15.7 |
| Elastomer Plasticizer | 11.41 | 11.4 | 15.2 | 13.3 |
| Hyd. Veg. Oil | 16.0 | 5.9 | 13.5 | 5.9 |
| Wax | — | 10.2 | — | 10.3 |
| Softening Point | 58° C. | 77° C. | 56° C. | 65° C. |

EXAMPLES 99–105

II. BUBBLE GUMS

| Type: | 99 | 100 Control | 101 | 102 Control |
|---|---|---|---|---|
| Elastomer | 7.9 | 7.0 | 11.9 | 10.8 |
| PVAc | 34.2 | 31.3 | 37.0 | 35.3 |
| Elastomer Plasticizer | 14.8 | 13.1 | 20.3 | 18.5 |
| Softener | 13.3 | 10.6 | 14.1 | 12.8 |
| Wax | — | 13.0 | — | 6.5 |
| Softening Point | 50° C. | 56° C. | 57° C. | 62° C. |

| Type: | 103 | 104 | 105 Control |
|---|---|---|---|
| Elastomer | 11.6 | 11.6 | 10.8 |
| PVAc | 31.4 | 31.4 | 31.3 |
| Elastomer Plasticizer | 19.8 | 19.8 | 18.5 |
| Softener | 13.7 | 14.5 | 12.3 |
| Wax | — | — | 6.5 |
| Softening Point | 53° C. | 53° C. | 59° C. |

By way of example, and not limitation, taste results of gum created from commercial gum bases that have wax vis-a-vis chewing gum, created from gum bases that do not include wax pursuant to the present invention will now be given.

The testing was performed using a blind study protocol. One hundred fifty participants were used in each of the three studies. Fifty percent of the participants in each study had chewed the commercial (control) product as their regular preferred gum before the study and 50% of the participants had chewed the control gum at least once during the preceding week before the study.

During the study, each participant was given one of the two gum products to chew for 12 minutes. This was followed by a cleansing period of 6 minutes. The second product was then chewed for 12 minutes. During the study, half of the participants were given the control first and half the new product. The participants were asked for their preferences based on a number of criteria.

The results were as follows:

EXAMPLE NO. 1A

In this example, the control gum comprised: 25.2% of a gum base with wax; 48.45% sorbitol; 16.80% glycerine; 8.01% mannitol; 1.33% flavor; and 0.21% encapsulated aspartame.

The no wax gum comprised: 25.2% of the gum base of the control modified pursuant to the present invention; 48.45% sorbitol; 16.80% glycerine; 8.01% mannitol; 1.33% flavor; and 0.21% encapsulated aspartame.

| PREFERENCES | Prefer No Wax % | Prefer Wax % |
|---|---|---|
| Overall Preference | 52 | 47 |
| Tastes Best | 52 | 46 |
| More Refreshing | 50 | 46 |
| Chewing Texture | 50 | 47 |
| Refreshing Breath | 55 | 40 |
| Long Lasting Taste | 52 | 41 |
| Better Spearmint Flavor | 49 | 48 |
| Better Appearance | 36 | 44 |
| Sweeter | 54 | 40 |
| Less Bitter | 44 | 45 |
| Softer | 79 | 16 |
| Better Smell | 38 | 51 |
| Stronger Flavor | 57 | 42 |
| Stuck More To Teeth | 31 | 31 |
| Rather Buy | 52 | 44 |

| FLAVOR OVERALL (1 MINUTE) | No Wax | Wax |
|---|---|---|
| "Excellent" | 23% | 21% |

| STRENGTH OF FLAVOR (1 MINUTE) | No Wax | Wax |
|---|---|---|
| "About Right" | 70% | 70% |

| FLAVOR OVERALL (12 MINUTES) | No Wax | Wax |
|---|---|---|

| -continued | | |
|---|---|---|
| "Excellent" | 9% | 7% |
| STRENGTH OF FLAVOR (12 MINUTES) | | |
| | No Wax | Wax |
| "About Right" | 51% | 56% |

EXAMPLE NO. 2A

In this example, the control gum comprised: 25.16% base with wax; 48.38% sorbitol; 8.00% mannitol; 16.66% glycerine; 1.55% flavor; and 0.25% encapsulated aspartame.

The no wax chewing gum comprised: 25.16% of the base of the control modified pursuant to the present invention; 48.28% sorbitol; 8.00% mannitol; 16.66% glycerine; 1.65% flavor; and 0.25% encapsulated aspartame.

| PREFERENCES | | |
|---|---|---|
| | Prefer No Wax % | Prefer Wax % |
| Overall Preference | 49 | 47 |
| Tastes Best | 47 | 50 |
| More Refreshing | 49 | 46 |
| Chewing Texture | 46 | 51 |
| Refreshing Breath | 46 | 48 |
| Longer Lasting Taste | 47 | 49 |
| Better Spearmint Flavor | 50 | 46 |
| Better Appearance | 39 | 39 |
| Sweeter | 44 | 47 |
| Less Bitter | 37 | 47 |
| Softer | 72 | 24 |
| Better Smell | 50 | 43 |
| Stronger Flavor | 53 | 44 |
| Stuck More To Teeth | 13 | 37 |
| Rather Buy | 48 | 48 |
| FLAVOR OVERALL (1 MINUTE) | | |
| | No Wax | Wax |
| "Excellent" | 22% | 17% |
| STRENGTH OF FLAVOR (1 MINUTE) | | |
| | No Wax | Wax |
| "About Right" | 64% | 65% |
| FLAVOR OVERALL (12 MINUTES) | | |
| | No Wax | Wax |
| "Excellent" | 11% | 7% |
| STRENGTH OF FLAVOR (12 MINUTES) | | |
| | No Wax | Wax |
| "About Right" | 48% | 47% |

EXAMPLE NO. 3A

In this example, the control gum comprised: 20.6% base with wax; 57.63% sugar; 20.39% corn syrup; 0.83% glycerine; and 0.55% flavor. The no wax chewing gum comprised: 20.6% of the base of the control modified pursuant to the invention; 59.49% sugar; 18.5% corn syrup; 0.83% glycerine; and 0.58% flavor.

| PREFERENCES | | |
|---|---|---|
| | Prefer No Wax % | Prefer Wax % |
| Overall Preference | 56 | 43 |
| Tastes Best | 53 | 44 |
| More Refreshing | 51 | 48 |
| Chewing Texture | 48 | 48 |
| Refreshing Breath | 51 | 45 |
| Longer Lasting Taste | 50 | 46 |
| Better Spearmint Flavor | 46 | 51 |
| Better Appearance | 45 | 38 |
| Sweeter | 40 | 55 |
| Less Bitter | 46 | 43 |
| Softer | 43 | 52 |
| Better Smell | 46 | 45 |
| Stronger Flavor | 46 | 52 |
| Stuck More to Teeth | 26 | 32 |
| Rather Buy | 51 | 45 |

EXAMPLE NO. 3A

| | No Wax | Wax |
|---|---|---|
| FLAVOR OVERALL (1 MINUTE) | | |
| "Excellent" | 21% | 21% |
| STRENGTH OF FLAVOR (1 MINUTE) | | |
| "About Right" | 71% | 68% |
| FLAVOR OVERALL (12 MINUTES) | | |
| "Excellent" | 7% | 6% |
| STRENGTH OF FLAVOR (12 MINUTES) | | |
| "About Right" | 45% | 38% |

Pursuant to the present invention, the glass transition temperature of the gum base is increased. As noted above, although providing a substantially wax-free chewing gum base provides many advantages, it has been found, at least with respect to certain bubble gum chewing gum bases that cold flow can become an issue during shipping and storage. This has been found to be due to the transition temperature of the gum bases without wax.

Referring now to FIG. 1, graphically, temperature (°C.) dependence of modulus for a typical gum base is illustrated. The graph depicts the glass transition temperature data graphically illustrating a typical curve of the modulus of a typical wax containing gum base versus temperature.

With respect to the graph, curve segment A–B is the temperature range wherein the heat energy is being absorbed and the attractive forces between the individual polymeric backbone chains of one polymeric chain to the other is strong but weakening. Curve point B is the glass transition temperature of the gum base.

Curve segment B–C is the temperature range wherein the attractive forces between the polymeric backbone chains are weakening to an even greater extent than previously. The polymeric backbone chains themselves begin to "slip" along each other. Curve point C represents the softening point temperature of the gum base.

Curve segment C–D is the temperature range wherein heat energy is being absorbed and the attractive forces between molecules of the individual polymeric backbone chains is strong but weakening. Curve point D represents the melting point temperature. Curve segment D–E is the temperature range wherein heat energy absorption is at a maximum and the individual polymeric backbone chains forces weaken.

As noted above, it has been found that by removing or at least substantially reducing the vinyl polymer softeners benzyl benzoate, benzyl butyrate, benzyl phenol acetate, acetyl triethyl citrate, diethyl malonate, ethyl oleate, sucrose octaacetate, diacetyl tartaric acid ester of mono- and di-glycerides, stearyl monoglyceridyl citrate, succinylated glycerides, lactylic and glyceryl lacto esters of fatty acids, butyl-2-decenoate, citronellyl butyrate, cresyl acetate, ethyl acetate, diethyl malonate, diethyl sebacate, triethyl citrate, diethyl succinate, glycerol tributyrate, ethyl laurate, ethyl acetoacetate, diethyl tartrate, glycerol triacetate and ethyl or butyl lactate from the gum base, the glass transition temperature can be raised. For example, by removing the softener glycerol triacetate from the base, a base with an advantageous glass transition temperature can be achieved. This provides a gum base that is substantially free of wax, yet has a sufficiently high glass transition temperature so that it can be easily shipped without necessitating costly refrigeration temperatures.

By way of example, and not limitation, further examples of the present invention will now be given:

EXAMPLE NO. 4

| | BASE FORMULA RANGES (in % by weight of base): | | | | | |
|---|---|---|---|---|---|---|
| Notes: (GT = Glycerol Triacetate) | w/wax w/GT, w/o AMG | w/o wax w/GT, w/AMG | w/o wax w/o GT w/AMG | w/wax w/GT, w/o AMG | w/o wax w/GT, w/AMG | w/o wax w/o GT w/AMG |
| EXAMPLE ID: | A1 | A2 | A3 | B1 | B2 | B3 |
| Polyisobutylene | 11.0 | 12.0 | 13.0 | 7.0 | 8.0 | 8.0 |
| PVA | 35.0 | 37.0 | 39.0 | 31.0 | 34.0 | 36.0 |
| Filler | 16.0 | 16.0 | 17.0 | 25.0 | 30.0 | 32.0 |
| Glyc. Triacetate Softener | 5.0 | 6.0 | — | 5.0 | 5.0 | — |
| AMG Softener | — | 4.0 | 4.0 | — | 3.0 | 3.0 |
| Elastomer Plasticizer | 18.0 | 20.0 | 22.0 | 13.0 | 15.0 | 16.0 |
| Wax | 7.0 | — | — | 13.0 | — | — |
| Other Softeners | 8.0 | 5.0 | 5.0 | 6.0 | 5.0 | 5.0 |
| Notes: (GT = Glycerol Triacetate) | w/wax w/GT, w/o AMG | w/o wax w/GT, w/AMG | w/o wax w/o GT w/AMG | w/wax w/GT, w/o AMG | w/o wax w/GT, w/o AMG | w/o wax w/o GT w/o AMG |
| EXAMPLE ID: | C1 | C2 | C3 | D1 | D2 | D3 |
| Polyisobutylene | 11.0 | 12.0 | 12.0 | 12.0 | 13.0 | 13.0 |
| PVA | 31.0 | 31.0 | 33.0 | 23.0 | 24.0 | 25.0 |
| Filler | 20.0 | 22.0 | 25.0 | 24.0 | 27.0 | 30.0 |
| Glyc. Triacetate Softener | 5.0 | 6.0 | — | 4.0 | 5.0 | — |
| AMG Softener | 4.0 | 6.0 | 6.0 | — | — | — |
| Elastomer Plasticizer | 19.0 | 20.0 | 21.0 | 18.0 | 19.0 | 20.0 |
| Wax | 6.0 | — | — | 7.0 | — | — |
| Other Softeners | 4.0 | 3.0 | 3.0 | 12.0 | 12.0 | 12.0 |
| Notes: (GT = Glycerol Triacetate) | w/wax w/GT, w/o AMG | w/o wax w/GT, w/o AMG | w/o wax w/o GT w/o AMG | w/wax w/GT, w/AMG | w/o wax w/GT, w/AMG | w/o wax w/o GT w/AMG |
| EXAMPLE ID: | E1 | E2 | E3 | F1 | F2 | F3 |
| Polyisobutylene | 9.0 | 9.0 | 10.0 | 18.0 | 20.0 | 21.0 |
| PVA | 42.0 | 44.0 | 48.0 | 21.0 | 23.0 | 24.0 |
| Filler | 9.0 | 9.0 | 10.0 | 28.0 | 32.0 | 33.0 |
| Glyc. Triacetate Softener | 10.0 | 10.0 | — | 3.0 | 3.0 | — |
| AMG Softener | — | — | — | 3.0 | 3.0 | 3.0 |
| Elastomer Plasticizer | 24.0 | 26.0 | 28.0 | 12.0 | 14.0 | 14.0 |
| Wax | 4.0 | — | — | 11.0 | — | — |
| Other Softeners | 2.0 | 2.0 | 4.0 | 4.0 | 5.0 | 5.0 |

| SAMPLE SELECTION FROM THE EXAMPLES - GLASS TRANSITION TEMPERATURE AT WHICH COLD FLOW MAY BEGIN TO OCCUR (°C.): | | | | | |
|---|---|---|---|---|---|
| Example ID | Temperature | Example ID | Temperature | Example ID | Temperature |
| A1 | 17 | B1 | 17 | C1 | 11 |
| A2 | 12 | B2 | 12 | C2 | −1 |
| A3 | 14 | B3 | 21 | C3 | 13 |

Figure 2:
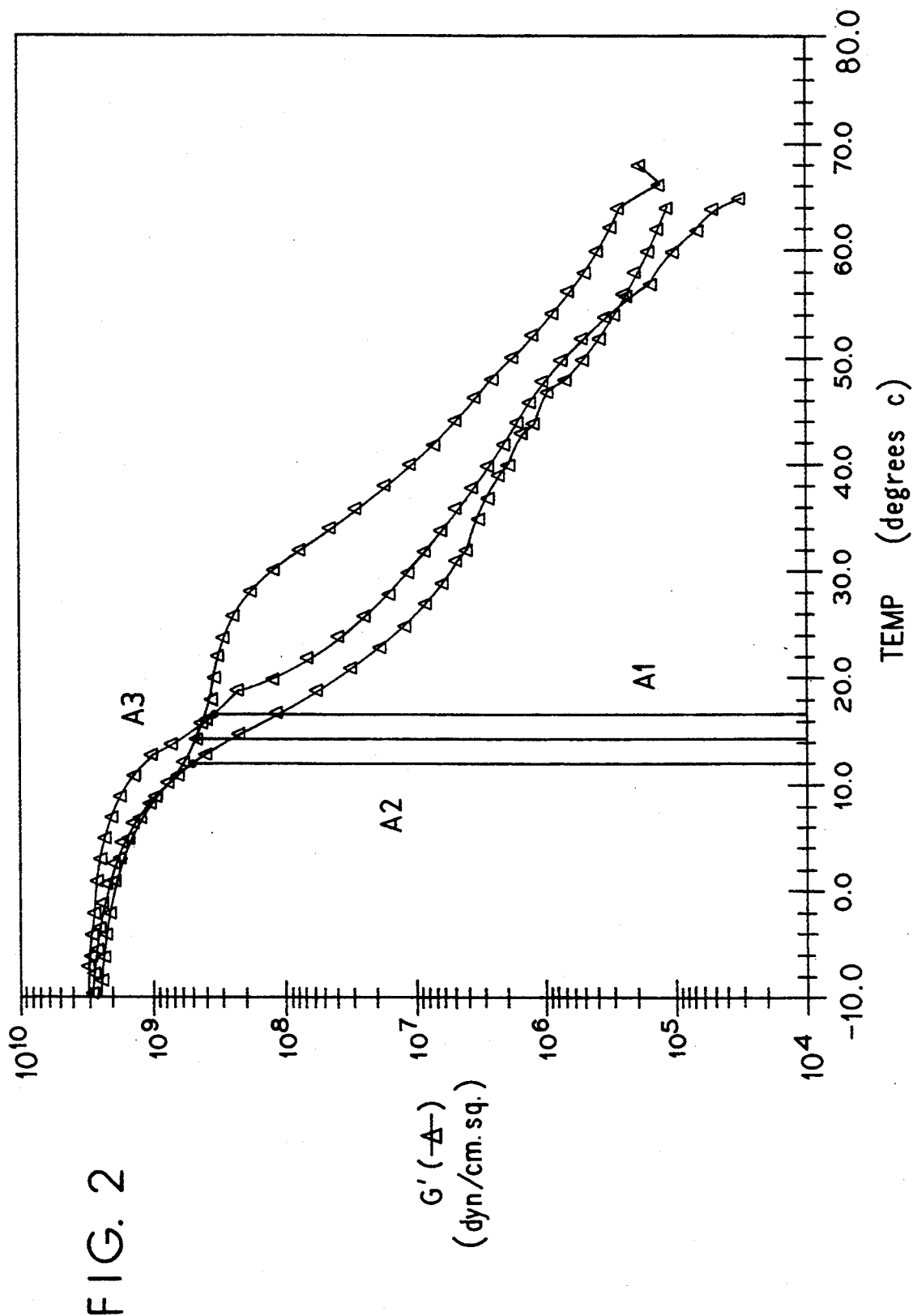
FIGS. 2-4 illustrate, graphically, glass transition temperatures for a typical wax-containing gum base, a wax-free gum base, and a wax-free glycerol triacetate-free gum base.
Figure 3:
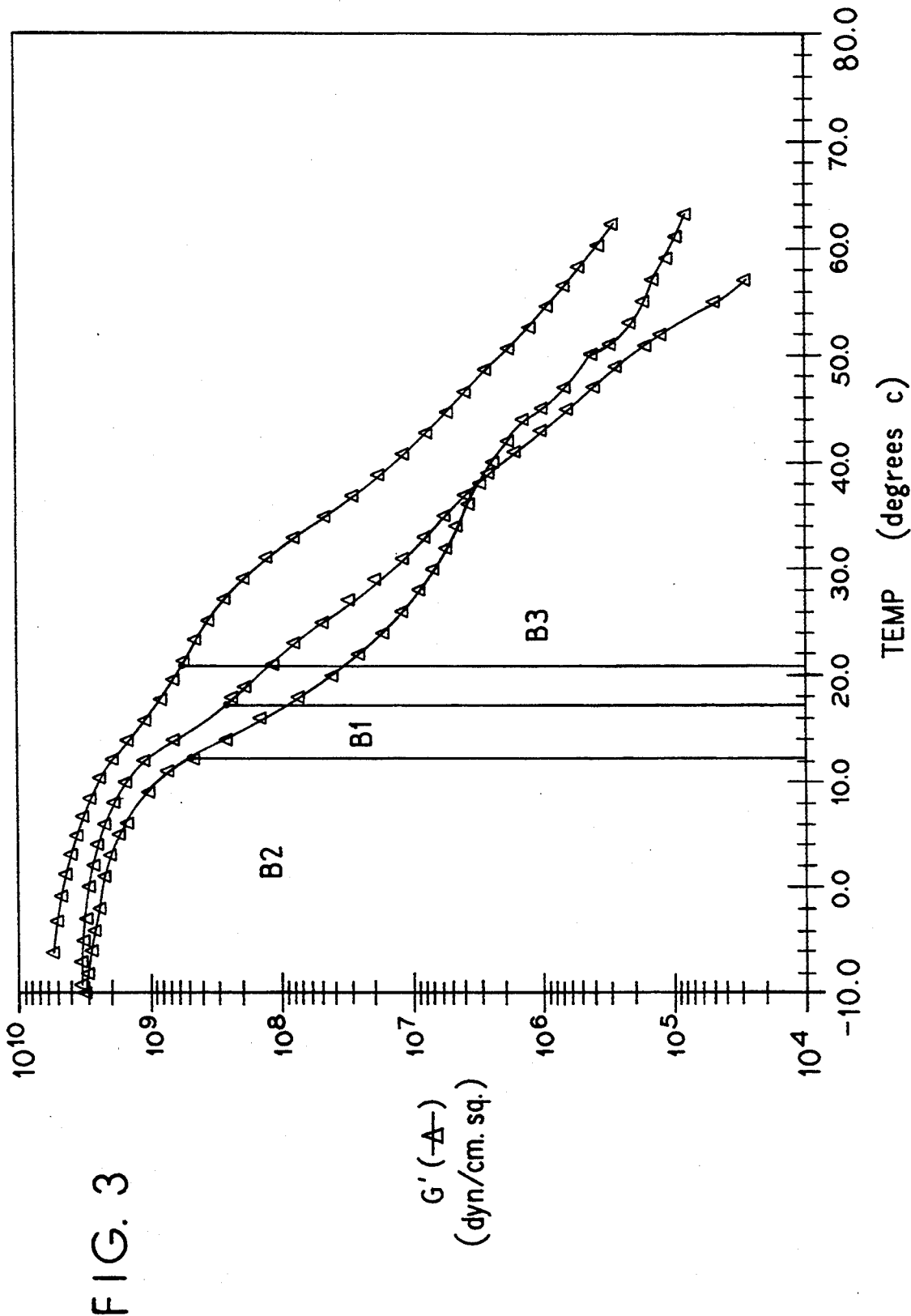
Figure 4:
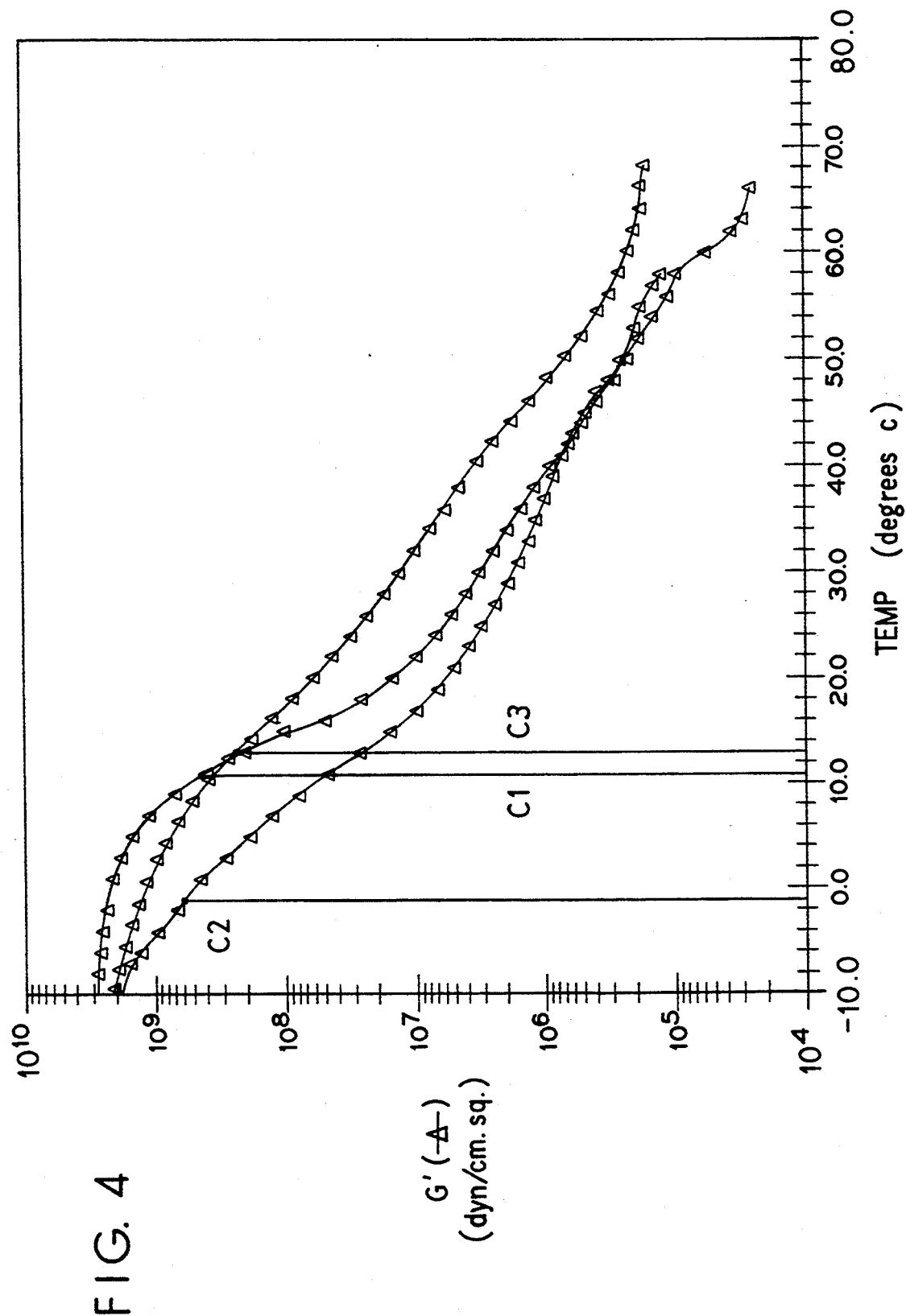

FIGS. 2–4 illustrate, graphically, the results of these experiments. As noted in the tables: A1, B1, and C1 represent bases including wax and glycerol triacetate; A2, B2, and C2 represent bases including glycerol triacetate but no wax; and A3, B3, and C3 represent bases that do not include wax or glycerol triacetate.

The removal of wax resulted in a decrease of from about 5° C. to about 12° C. in Tg temperatures as shown from examples A2 through C2 when compared to the Tg temperatures for control bases containing wax, examples A1 through C1. Removal of glycerol triacetate from the wax-free examples A2 through C2 resulted in an increase of from about 2° C. to about 14° C. in Tg temperatures as shown for examples A3 through C3.

While the embodiments of the invention disclosed herein are presently considered to be preferred, various modifications and improvements can be made without departing from the spirit and scope of the invention. The scope of the invention is indicated in the appended claims, and all changes that come within the meaning and range of equivalency of the claims are intended to be embraced therein.

We claim:

1. A wax-free gum base comprising:
   an elastomer;
   a vinyl polymer;
   an elastomer plasticizer; and
   being substantially free of vinyl polymer softeners selected from the group consisting of benzyl benzoate, benzyl butyrate, benzyl phenol acetate, acetyl triethyl citrate, diethyl malonate, ethyl oleate, sucrose octaacetate, diacetyl tartaric acid ester of mono- and di-glycerides, stearyl monoglyceridyl citrate, succinylated glycerides, lactylic and glyceryl lacto esters of fatty acids, butyl-2-decenoate, citronellyl butyrate, cresyl acetate, ethyl acetate, diethyl malonate, diethyl sebacate, triethyl cidrate, diethyl succinate, glycerol tributyrate, ethyl laurate, ethyl acetoacetate, glycerol triacetate, diethyl tartrate and ethyl or butyl lactate, the gum base having a glass transition temperature that is greater than a substantially identical wax-free gum base that includes a greater amount of said vinyl polymer softeners.

2. The wax-free gum base of claim 1 wherein the gum base is a bubble gum base.

3. The wax-free chewing gum base of claim 1 comprising:
   about 10 to about 50 weight percent vinyl polymer elastomer;
   5 to about 30 weight percent soft elastomer;
   about 8 to about 30 weight percent elastomer plasticizer;
   about 5 to about 40 weight percent filler; and
   about 1 to about 20 weight percent softener.

4. The wax-free gum base of claim 1 wherein the elastomer includes from approximately 5 to about 20 weight percent polyisobutylene.

5. The wax-free gum base of claim 1 wherein the vinyl polymer includes polyvinyl acetate.

6. The wax-free gum base of claim 1 wherein the gum base includes acetylated monoglyceride.

7. The wax-free gum base of claim 1 wherein the gum base does not include any glycerol triacetate.

8. The wax-free gum base of claim 1 wherein the gum base does not include a hard elastomer.

9. The wax-free gum base of claim 1 wherein the gum base does not include any terpene resin.

10. The wax-free gum base of claim 1 wherein the gum base has a glass transition temperature that is greater by at least 2° C. than the glass transition temperature of the substantially identical gum base.

11. An at least substantially wax-free bubble gum base comprising:
    from approximately 10 to about 50 weight percent vinyl polymer;
    from approximately 5 to about 30 weight percent soft elastomer;
    from approximately 5 to about 40 weight percent filler;
    from approximately 5 to about 30 weight percent elastomer plasticizer;
    from approximately 1 to about 20 weight percent softeners; and
    the base is sufficiently free of glycerol triacetate to provide a glass transition temperature of the bubble gum base that is greater by at least 2° C. than a glass transition temperature of a substantially similar bubble gum base including a greater amount of glycerol triacetate.

12. The bubble gum base of claim 11 wherein the elastomer includes from approximately 5 to about 20 weight percent polyisobutylene.

13. The bubble gum base of claim 11 wherein the vinyl acetate includes approximately 15 to about 45 weight percent high molecular weight polyvinyl acetate.

14. The bubble gum base of claim 11 wherein the gum base includes acetylated monoglyceride.

15. The bubble gum base of claim 11 wherein the gum base does not include any glycerol triacetate.

16. A method for creating a gum base comprising the steps of:
    mixing ingredients that include at least an elastomer, an elastomer plasticizer, and a vinyl polymer, but not including a vinyl polymer softener selected from the group consisting of benzyl benzoate, benzyl butyrate, benzyl phenol acetate; acetyl triethyl citrate; diethyl malonate, ethyl oleate, sucrose octaacetate, diacetyl tartaric acid ester of mono- and di-glycerides, stearyl monoglyceridyl citrate, succinylated glycerides, lactylic and glyceryl lacto esters of fatty acids, butyl-2-decenoate, citronellyl butyrate, cresyl acetate, ethyl acetate, diethyl malonate, diethyl sebacate, triethyl citrate, diethyl succinate, glycerol tributyrate, ethyl laurate, ethyl acetoacetate, glycerol triacetate, diethyl tartrate and ethyl or butyl lactate to create a gum base that has a glass transition temperature that is greater than a substantially similar gum base that includes said vinyl polymer softener.

17. The method of claim 16 including the step of using: from approximately 10 to about 50 weight percent vinyl polymer; from approximately 5 to about 30 weight percent soft elastomer; from approximately 5 to about 40 weight percent filler; from approximately 5 to about 30 weight percent elastomer plasticizer; and from approximately 1 to about 20 weight percent softeners to create the gum base.

18. The method of claim 16 including the step of softening the vinyl polymer by adding a softener to the gum base mixture during the mixing process.

19. A method for making chewing gum comprising the steps of:
    providing a gum base that includes at least an elastomer, an elastomer plasticizer, polyvinyl acetate, and does not include a wax or glycerol triacetate; and
    adding thereto a water soluble gum portion.

20. A method for making a gum base having improved storage characteristics comprising the step of reducing a content in the gum base of at least one softener that reduces the glass transition temperature of the gum base, as compared to a substantially identical gum bases, and thereby making a gum base having a glass transition temperature that is at least 2° C. greater than the glass transition temperature of the substantially identical gum base that does not include the reduced content of at least one softener.

* * * * *